United States Patent [19]

Tsuboi et al.

[11] Patent Number: 5,457,768
[45] Date of Patent: Oct. 10, 1995

[54] SPEECH RECOGNITION APPARATUS USING SYNTACTIC AND SEMANTIC ANALYSIS

[75] Inventors: Hiroyuki Tsuboi, Kobe; Yoichi Takebayashi, Yokohama, both of Japan

[73] Assignee: Kabushiki Kaisha Toshiba, Kawasaki, Japan

[21] Appl. No.: 928,417

[22] Filed: Aug. 12, 1992

[30] Foreign Application Priority Data

Aug. 13, 1991 [JP] Japan ................................ 3-203012
Jul. 10, 1992 [JP] Japan ................................ 4-184220

[51] Int. Cl.$^6$ .................................................. G10L 9/00
[52] U.S. Cl. ........................ 395/2.4; 395/2.28; 395/2.52
[58] Field of Search ............................ 395/2.28, 2.12, 395/2.57, 2.6, 2.75, 2.4, 2.52; 381/42, 43

[56] References Cited

U.S. PATENT DOCUMENTS

| | | | |
|---|---|---|---|
| 3,704,345 | 11/1972 | Coker et al. | 395/2.75 |
| 4,349,700 | 9/1982 | Pirz et al. | 395/2.5 |
| 4,783,809 | 11/1988 | Glinski | 381/43 |
| 5,062,047 | 10/1991 | Tanaka et al. | 364/419.03 |

FOREIGN PATENT DOCUMENTS

| | | |
|---|---|---|
| 0430615 | 6/1991 | European Pat. Off. . |
| 4031421 | 4/1991 | Germany . |
| 4031638 | 4/1991 | Germany . |

OTHER PUBLICATIONS

Makino et al. IEEE 14–17 May 1991.
A Japanese Text Dictation System Based On Phoneme Recognition and a Dependency Grammar.

*Primary Examiner*—Allen R. MacDonald
*Assistant Examiner*—Richemond Dorvil
*Attorney, Agent, or Firm*—Oblon, Spivak, McClelland, Maier & Neustadt

[57] ABSTRACT

A speech recognition apparatus comprises a speech input unit for receiving an input speech signal, analyzing it, and outputting a speech feature parameter series, a speech recognition unit for extracting a speech feature vector from the parameter series, and matching it with a plurality of predetermined words to output a series of word candidates used as keywords, a syntactic analysis unit for analyzing the series of the word candidates as the keywords according to syntactic limitation, and generating a sentence candidate.

22 Claims, 26 Drawing Sheets

INPUT SENTENCE
「EETO HANBAAGA TOO UUNTO KOOHII MITTSU KUDASAI 」
SENTENCE
「HANBAAGA」 「KOOHII」 「MITTSU」 「KUDASAI」
SUB-SENTENCE
「HANBAAGA」 「KOOHII」

( UNDERLINED WORDS OF INPUT SENTENCE ARE KEYWORDS )

| WORD | A PART OF SPEECH | CONNECTABLE RANGE |
|---|---|---|
| HANBAAGA | HAMB | S1 : E1 |
| CHIIZUBAAGA | CHEESEB | S2 : E2 |
| POTETO | POTATO | S3 : E3 |
| KOOHII | COFFEE | S4 : E4 |
| KOORA | COLA | S5 : E5 |
| IKKO | ONE | S6 : E6 |
| HITOTSU | ONE | S7 : E7 |
| NIKO | TWO | S8 : E8 |
| FUTATSU | TWO | S9 : E9 |
| SANKO | THREE | S10 : E10 |
| MITTSU | THREE | S11 : E11 |
| KUDASAI | KUDASAI | S12 : E12 |
| ONEGAISHIMASU | KUDASAI | S13 : E13 |
| TSUIKA | TSUIKA | S14 : E14 |
| IRANAI | IRANAI | S15 : E15 |

FIG. 3

| GRAMMAR NUMBER | GRAMMAR RULE | SEMANTIC FORMING PROCESS |
|---|---|---|
| 1) | <S> ::= <NP><VP> | {X0=mf(X2, X1)} |
| 2) | \| <NP> | {X0=mf(ORDER, X1)} |
| 3) | <NP> ::= <NP><ITEM> | {X0=mf(?, X1, X2)} |
| 4) | \| <ITEM> | {X0=mf(?, 0, X1)} |
| 5) | <VP> ::= KUDASAI | {X0=ORDER} |
| 6) | \| TUIKA | {X0=APPEND} |
| 7) | \| IRANAI | {X0=DELETE} |
| 8) | <ITEM> ::= <FOOD><NUM> | {X0=ms(X1, X2)} |
| 9) | \| <FOOD> | {X0=ms(X1, ?)} |
| 10) | \| <DRNK><NUM> | {X0=ms(X1, X2)} |
| 11) | \| <DRNK> | {X0=ms(X1, ?)} |
| 12) | <FOOD> ::= HANB | {X0=X1} |
| 13) | \| CHEESEB | {X0=X1} |
| 14) | \| POTATO | {X0=X1} |
| 15) | <DRNK> ::= COFFEE | {X0=X1} |
| 16) | \| COLA | {X0=X1} |
| 17) | <NUM> ::= ONE | {X0=1} |
| 18) | \| TWO | {X0=2} |
| 19) | \| THREE | {X0=3} |

(mf0: GENERATION OF FRAME, ms0: GENERATION OF SLOT, ?: UNDETERMINED SEMANTIC EXPRESSION, X0: SEMANTIC EXPRESSION OF LEFT SIDE OF GRAMMAR RULE, X1, X2: SEMANTIC EXPRESSION OF FIRST AND SECOND TERMS OF RIGHT SIDE OF GRAMMAR RULE, Sn, En: CONNECTABLE WORD RANGE)

FIG. 4

```
( (act     action)           ← SLOT  ⎫
  (item    name number)      ← SLOT  ⎬ FRAME
           ⋮                         ⎪
  (item    name number) )    ← SLOT  ⎭
``` action : ACTION INDICATED BY SPEECH
name   : NAME OF ARTICLE
number : NUMBER OF ARTICLES (a) FORM OF SEMANTIC EXPRESSION action — ORDER, APPEND, DELETE, NOACT
name   : HAMB, CHEESEB, POTATO
         COFFEE, COLA
number : 1, 2, 3, NOSIZE (b) EXAMPLES OF ACTION, NAME OF ARTICLE, AND
    NUMBER OF ARTICLES IN THE EMBODIMENT

FIG. 5

| STATE NO. | A PART OF INPUT SPEECH | KUDASAI | TSUIKA | IRANAI | HANB | CHIIZU | POTETO | KOOHII | KOORA | IKKO | NIKO | SANKO |
|---|---|---|---|---|---|---|---|---|---|---|---|---|
| 0 |  |  |  |  | (1) s6 | s7 | s8 | s8(8) | s9 s10 |  |  |  |
| 1 | (15) |  |  |  |  |  |  |  |  |  |  | (20) acc |
| 2 |  | s13 | s14 | s15 | s6 | s7 | s8 | s9(8) | s10 |  |  | r2 |
| 3 |  | r4 | r4 | r4(6) | r4 | r4 | r4 | r4 | r4 |  |  | r4 |
| 4 |  | r9 | r9 | r9(4) | r9 | r9 | r9 | r9 | r9 |  |  | r9 |
| 5 |  | r11 | r11 | r11 | r11 | r11 | r11(11) | r11(11) | r11 | s17 | s18 | s19 |
| 6 |  | r12 | r12 | r12(2) | r12 | r12 | r12 | r12 | r12 | s17 | s18 | s19 |
| 7 |  | r13 | r13 | r13 | r13 | r13 | r13 | r13 | r13 | r12 | r12 | r12 |
| 8 |  | r14 | r14 | r14 | r14 | r14 | r14 | r14 | r14 | r13 | r13 | r13 |
| 9 |  | r15 | r15 | r15 | r15 | r15 | r15 | r15(9) | r15 | r14 | r14 | r14 |
| 10 |  | r16 | r16 | r16 | r16 | r16 | r16 | r16 | r16 | r15 | r15 | r15 |
| 11 |  |  |  |  |  |  |  |  |  | r16 | r16 | r16 |
| 12 |  | r3 | r3 | r3 | r3 | r3 | r3(13) | r3 | r3 |  |  | (15) r1 |
| 13 |  |  |  |  |  |  |  |  |  |  |  | (16) r5 |
| 14 |  | r8 | r8 | r8 | r8 | r8 | r8 | r8 | r8 |  |  | r6 |
| 15 |  | r17 | r17 | r17 | r17 | r17 | r17 | r17 | r17 |  |  | r7 |
| 16 |  | r18 | r18 | r18 | r18 | r18 | r18 | r18 | r18 |  |  | r8 |
| 17 |  | r19 | r19 | r19 | r19 | r19 | r19 | r19 | r19 |  |  | r17 |
| 18 |  | r10 | r10 | r10 | r10 | r10 | r10 | r10 | r10 |  |  | r18 |
| 19 |  |  |  |  |  |  |  |  |  |  |  | r19 |
| 20 |  |  |  |  |  |  |  |  |  |  |  | r10 |

FIG. 6A

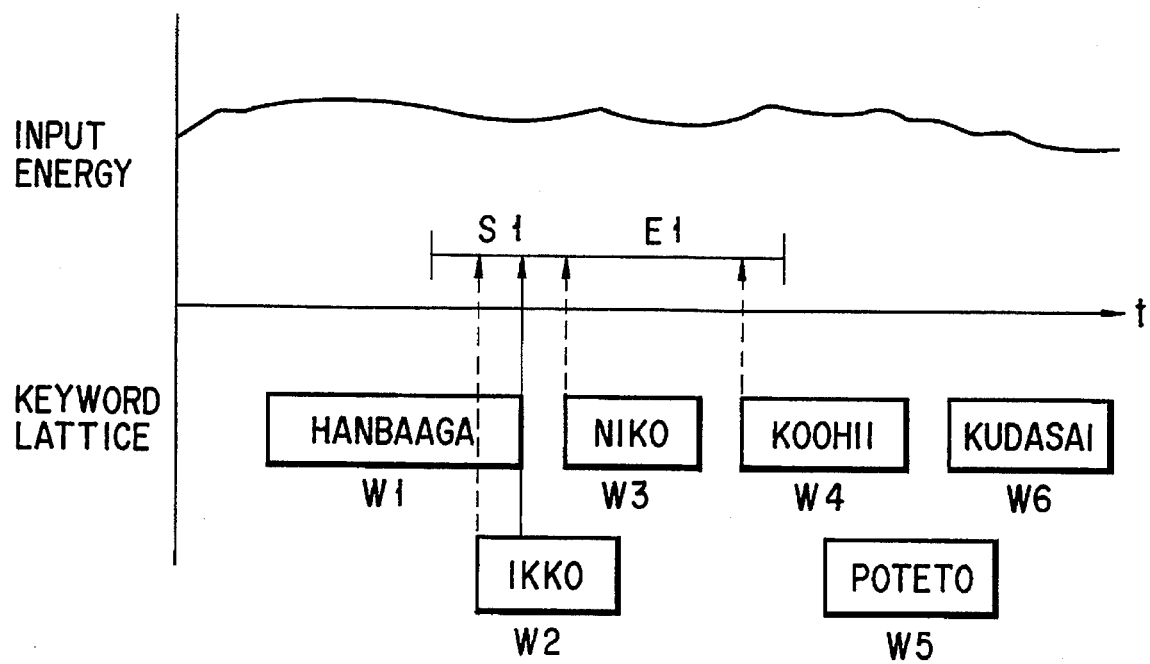
F I G. 11

| PROCESS NO. | ANALYSIS STACK | INPUT WORD | ACTION | APPLICABLE GRAMMAR | SEMANTIC REPRESENTATION |
|---|---|---|---|---|---|
| (1) | (0)- | HANBAAGA | s6 | (HAMB) | |
| (2),(3) | (0)-(①,6)- | HANBAAGA | r12 | ①FOOD::=HAMB | X0 = HAMB |
| (4),(5) | (0)-(②,4)- | HANBAAGA | r9 | ②ITEM::=FOOD | (HAMB NONUM) |
| (6),(7) | (0)-(③,3)- | HANBAAGA | r4 | ③NP ::=ITEM | (?,HAMB) |
| (8) | (0)-(3,2)- | KOOHII | s9 | ④(COFFEE) | |
| (9),(10) | (0)-(③,2)-(④,4)- | KOOHII | r15 | ⑤DRINK::=COFFEE | X0 = COFFEE |
| (11),(12) | (0)-(③,2)-(⑥,5)- | KOOHII | r11 | ⑥ITEM::=DRINK | (COFFEE NONUM) |
| (13),(14) | (0)-(③,2)-(⑦,12)- | KOOHII | r3 | ⑦NP ::=NP ITEM | (?(HAMB NONUM) (COFFEE NONUM)) |
| (15) | (0)-(⑦,2)- | KUDASAI | s13 | ⑧(KUDASAI) | |
| (16),(17) | (0)-(⑦,2)-(⑨,13) | $ | r5 | ⑨VP ::=KUDASAI | X0 = ORDER |
| (18),(19) | (0)-(⑦,2)-(⑩,11) | $ | r1 | ⑩S ::=NP VP | (ORDER (HAMB NONUM) (COFFEE NONUM)) |
| (20) | (0) (⑩,1)- | $ | acc | | |

F I G. 12

(N = 4)

TLF$_N$ : LIKELIHOOD OF SENTENCE OF N WORDS

LF$i$ : LIKELIHOOD OF i TH WORD

T$_N$ : CONTINUOUS TIME OF SENTENCE OF N WORDS t$i$ : CONTINUOUS TIME OF i TH WORD $\alpha$ : COEFFICIENT $$TLF_N = (\sum_{i}^{N} LF_i)/N + \alpha(\sum_{i}^{N} t_i)/T_N$$

| :EETO: | HANBAAGA | :TOO UUNTO: | KOOHII | MITTSU | KUDASAI |
|--------|----------|-------------|--------|--------|---------|
| LF1'   | LF1      | LF2'        | LF2    | LF3    | LF4     |

FIG. 14A $LF_{i,i+1}$ : LIKELIHOOD DETERMINED BY CONSIDERING CONNECTION BETWEEN i-th WORD AND i+1-th WORD $LF'_j$ : LIKELIHOOD OF j-th PERIOD NOT TO BE RECOGNIZED

N : NUMBER OF WORDS

N' : NUMBER OF PERIODS NOT TO BE RECOGNIZED $\beta$ : COEFFICIENT $$TLF_N = (\sum_{i}^{N} LF_{i,i+1}) / N + \beta (\sum_{j}^{N'} LF'_j) / N'$$

§ xoff LEFT RIGHT...

ANALYSIS OF INPUT SERIES IS STOPPED WHEN THE INPUT SERIES IS FOLLOWED BY EITHER END POINT SIGN "LEFT" OR "RIGHT".

§ xoffr RIGHT LEFT...

ANALYSIS OF INPUT SERIES IS STOPPED WHEN THE INPUT SERIES IS FOLLOWED BY ANY OF END POINT SIGNS "LEFT"... AND "RIGHT".

§ xon LEFT RIGHT...

ANALYSIS OF INPUT SERIES IS STOPPED WHEN THE INPUT SERIES IS FOLLOWED BY EITHER END POINT SIGN "LEFT" OR "RIGHT".

§ xonr RIGHT LEFT...

ANALYSIS OF INPUT SERIES IS STOPPED WHEN THE INPUT SERIES IS FOLLOWED BY ANY OF END POINT SIGNS "LEFT"... AND "RIGHT".

§ xinit flag

CONNECTION TABLE IS INITIALIZED. IF FLAG IS 0, ALL CONNECTION ATTRIBUTES ARE DISABLED, AND IF FLAG IS 1, ALL ARE ABLED.

§ xcl LEFT...

NO SIGN FOLLOWING END POINT SIGN "LEFT" IS CONNECTED.

§ xclr RIGHT...

NO SIGN IS CONNECTED BEFORE END POINT SIGN "RIGHT".

§ xall LEFT...

ANY SIGN FOLLOWING END POINT SIGN "LEFT" IS CONNECTABLE.

§ xallr RIGHT...

ANY SIGN APPEARING BEFORE END POINT SIGN "RIGHT" IS CONNECTABLE.

§ xons SYM...

COMBINATION OF END POINT SIGNS "SYM" IS CONNECTABLE.

§ xaffs SYM...

COMBINATION OF END POINT SIGNS "SYM" IS NOT CONNECTABLE.

(1) // SAME ARTICLE NAMES DO NOT CONTINUE.
§ xoffs    HAMB CHEESEB FISHB POTATO
§ xoffs    COFFEE COLA JUICE ICECOFFEE (2) // SAME SIZES DO NOT CONTINUE.
§ xoffs    LARGE MEDIUM SMALL NORMAL (3) // NUMERALS DO NOT CONTINUE.
§ xoff    ONE   ONE TWO THREE FOUR FIVE
§ xoff    TWO   ONE TWO THREE FOUR FIVE
§ xoff    THREE ONE TWO THREE FOUR FIVE
§ xoff    FOUR  ONE TWO THREE FOUR FIVE
§ xoff    FIVE  ONE TWO THREE FOUR FIVE (4) // ONLY NUMERALS APPEAR BEFORE "ZUTSU".
§ xclr    ZUTSU
§ xcnr    ZUTSU ONE TWO THREE FOUR FIVE (5) // "SOREZORE" CAN BE FOLLOWED BY NUMERALS AND SIZES.
§ xcl     SOREZORE
§ xcn     SOREZORE ONE TWO THREE FOUR FIVE LARGE
          MEDIUM SMALL NORMAL (6) // "ZENBU" IS NOT FOLLOWED BY ARTICLE NAME.
§ xoff    ZENBU HAMB CHEESEB FISHB POTATO COFFEE
          COLA JUICE ICECOFFEE (7) // "SOREKARA" OR "ATO" DOES NOT APPEAR BEFORE "HAI",
      "EE" OR "IIE".
§ xoffr   HAI SOREKARA ATO
§ xoffr   EE  SOREKARA ATO
§ xoffr   IIE SOREKARA ATO "HANB" = HAMBURGER, "CHEESEB" = CHEESE BURGER,
"FISHB" = FISH BURGER, "LARGE" = DAI (IN JAPANESE), "ONE" =
IKKO, HITOTSU (IN JAPANESE)

FIG. 16

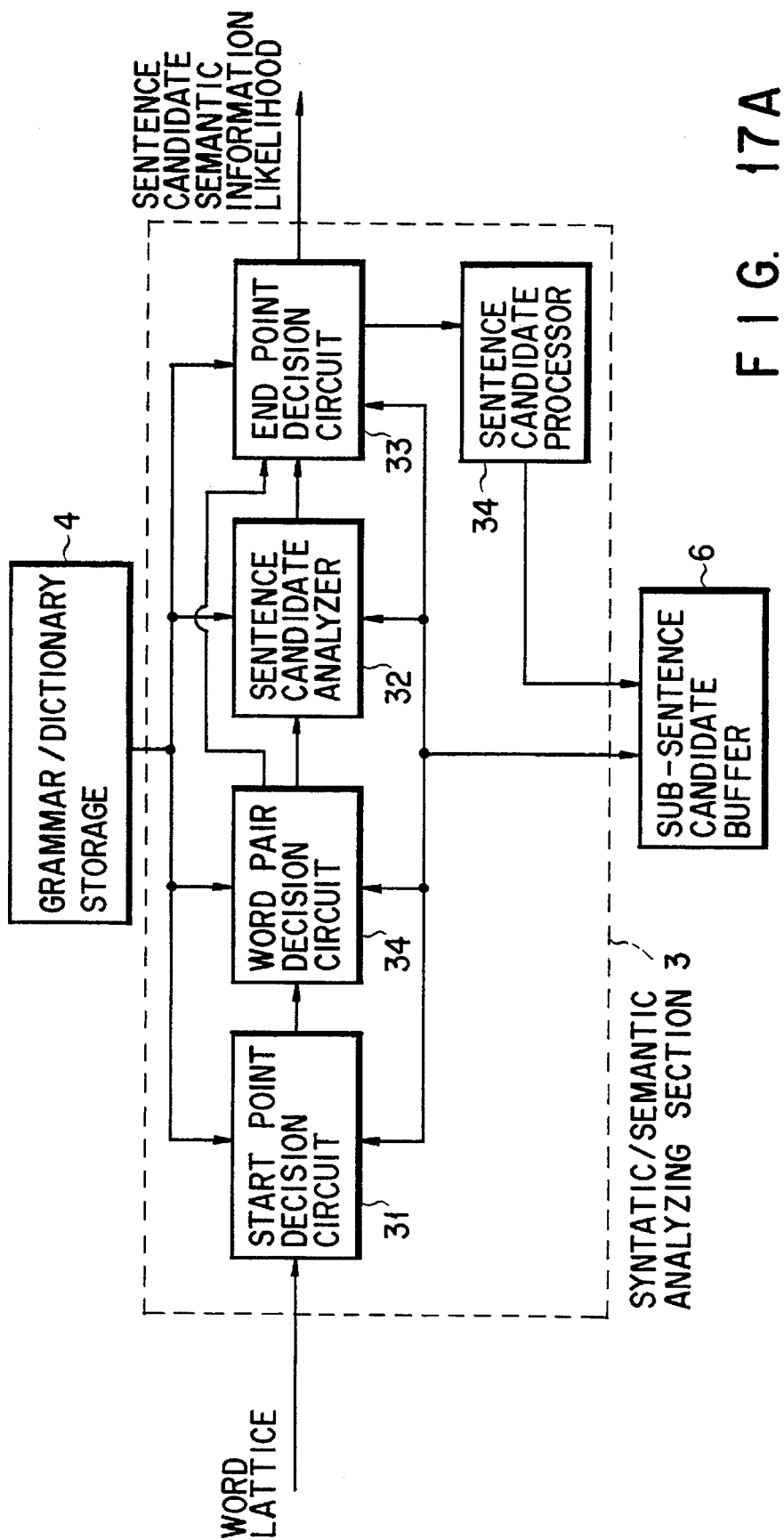

| LEFT WORD | RIGHT WORD | LEFT POINT | RIGHT POINT | CONNECTION DEGREE | LEFT WORD LIKELIHOOD | RIGHT WORD LIKELIHOOD |
|---|---|---|---|---|---|---|
| HAMB- | NUM | -5 | 40 | P1 | 0.8 | 0.6 |
| HAMB | CHEESEB | -5 | 60 | P2 | 0.8 | 0.7 |
| HAMB | COFFEE | -5 | 60 | P3 | 0.8 | 0.7 |
| ----- | ----- | ----- | ----- | ----- | ----- | ----- |

FIG. 18A

|     |   |   |   |   |   |
|-----|---|---|---|---|---|
| (a) |   | 1 | 2 | 3 |   |
| (b) |   |   | 1 | 2 | 3 |

FIG. 21

|     |   |   |   |   |   |
|-----|---|---|---|---|---|
| (a) |   | 1 | 2 | 3 |   |
| (b) |   |   | 1 | 2 | 3 |
| (c) |   | 1 | 2 | 3 | 4 |

FIG. 23

| JAPANESE | ENGLISH |
|---|---|
| EETO HANBAAGA TOO UUNTO KOOHI MITTSU KUDASAI | Eh... one hamburger and... uhm... three coffee, please. |
| HANBAAGA | hamburger |
| KOOHII | coffee |
| MITTSU | three |
| KUDASAI, ONEGAISHIMASU | please |
| CHIIZUBAAGA | cheeseburger |
| POTETO | french fries |
| KOORA | cola |
| IKKO, HITOTSU | one |
| NIKO, FUTATSU | two |
| SANKO, MITTSU | three |
| TSUIKA | more |
| IRANAI | no thank you |
| EETO | eh... |
| TOO | and... |
| UUNTO | uhm... |
| YONKO | four |

F I G. 24

SPEECH RECOGNITION APPARATUS USING SYNTACTIC AND SEMANTIC ANALYSIS

BACKGROUND OF THE INVENTION

1. Field of the Invention

The present invention relates to a speech recognition apparatus using syntactic and semantic analysis.

2. Description of the Related Art

Recently, there have been attempts in which a person gives instructions to machines directly by means of speech, and various techniques for speech recognition have been developed.

At present, however, the speech dialogue system between human and machines have not yet been realized. This is, in part, due to a problem of many variations of speech. Natural spoken language (spontaneous speech) is ambiguous, as compared to written language. In spontaneous speech, not only grammar but also units of sentences and boundaries of sentences have many variations. In addition, spontaneous speech includes unintentional utterances such as speech meaningless words, muttering, noise, etc.

Conventional speech recognition apparatuses cannot cope with such variations of input speech. In these apparatuses, a person must input predetermined words in a limited vocabulary according to a predetermined sequence or grammar, and the input of such meaningless words as "er" or "uh" or continuously spoken sentences cannot be recognized.

In the conventional speech recognition apparatus, an input speech is first detected, and the detected speech period is regarded as continuous series of words. Thus, the detected speech period is analyzed and evaluated as a complete sentence. Specifically, information such as a variation in speech energy is utilized for detecting a starting point or starting and end points of the input speech period, thereby detecting an input speech period as a complete sentence. Subsequently, an input vector extracted from speech feature parameters of input speech is matched with reference vector of words or phonemes. The extracted candidates of words and phonemes are fed into syntactic and semantic analysis by using syntactic and semantic information. In the above processing, candidates of input speech must be grammatically well formed utterances, and words and phonemes included in the speech are regarded as temporally continuous meaningful series and evaluated as a sentence.

In the above method, however, when there are variations of the input speech such as noise, meaningless words (e.g. "er", "uh"), a silent period, muttering, non-verbal sounds, ellipsis, and out-of-vocabulary words, the syntactic and semantic analysis of the entire speech fails.

To solve this problem, there is proposed a method wherein a meaning such as a category is given to noise and silent periods and the noise and silent periods are analyzed under the same conditions as other meaningful elements. However, because of uncertainty of position (time) of appearance of these elements, the amount of calculations increases considerably and the scope of processing is limited.

There is another problem in the conventional method, in which starting and end points of a speech may be determined only by acoustic features, irrespective of syntactic and semantic processing. In this case, syntactic and semantic processing of noise, meaningless words (e.g. "er", "uh"), a silent period, muttering, non-verbal sounds, ellipsis, and out-of-vocabulary words, which occur within an input speech period, may fail.

In the above processing, there is proposed an analysis method in which a range of allowance is provided in a speech period, i.e. a movable range of an end point. In this case, too, the starting point of the input speech is treated as being fixed beforehand. Thus, the problem in this case is the same as that in the case where both starting and end points are fixed.

Further, a spotting method is known as a method of providing a range of allowance to the starting and end points for matching with reference vectors. In this case, the starting and end points of the unit of matching, e.g. a word or a phoneme, is provided with the range of allowance, and the starting and end points of an input speech are determined on the basis of likelihood between input vector and reference vector. It is necessary to perform linguistic processing, i.e. to treat grammatically well-formed sentence, muttering and ellipsis in the input speech as matching units (i.e. words, etc.), regard all of word series and phoneme series in the speech as meaningful unit series, and analyze and evaluate the meaningful unit series as complete well-formed sentences. Thus, the scope of processing is limited.

As stated above, at present, there is no robust spontaneous speech understanding method using syntactic and semantic analysis of input speech. For this reason, in the conventional speech recognition apparatus, the speech interface must require input of speech in units of a syntactically fixed sentence. The conventional speech recognition apparatus cannot recognize spontaneous speech in natural human-machine dialogues, including noise, meaningless words (e.g. "er", "uh"), a silent period, muttering, ellipsis, and out-of-vocabulary words.

In the conventional speech recognition apparatus, spontaneous speech cannot be processed as a speech input, then predetermined words in a limited vocabulary according only to a predetermined sequence or grammar can be recognized, and the input of such meaningless words as "er" or "uh" or continuously spoken sentences make recognition error.

SUMMARY OF THE INVENTION

The object of the present invention is to provide a speech recognition apparatus capable of processing a spontaneous speech in which meaningless words or two or more continuous sentences may be included.

The speech recognition apparatus of the present invention comprises a speech input unit for receiving a speech signal; a speech recognition unit for analyzing the input speech signal from the speech input unit to obtain a speech feature parameter series, and matching an input speech feature vector extracted from the parameter series with reference vectors of predetermined words to be recognized, thereby outputting word candidates in the form of a word lattice; and a syntactic analysis unit for subjecting to syntactic analysis each word candidate output from the speech recognition unit in the form of the word lattice on the basis of syntactic limitations, thereby generating a sentence candidate.

Specifically, according to this invention, an end point of the input speech pattern is successively shifted by a predetermined time (e.g. 8 msec), and predetermined word recognition is performed in each of a plurality of start point candidate periods determined with respect to each position of the shifted end point, i.e. in each of periods between each position of the shifted end point and different start points, thereby generating many word candidates. Using these word candidates as keywords, sentence candidates are generated. As a result, the contents of necessary data are fully considered to understand an input speech and extract a semantic expression, thereby realizing speech recognition of speech including, for example, meaningless words such as "ur" and "er", silent periods, muttering and omissions. Since natural speeches between persons and machines in actual situations can be processed, the human-machine interface capacity is remarkably enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 shows a word dictionary and connectable word ranges;

FIG. 4 shows grammar rules including rules for semantic analysis processing;

FIG. 5 shows a form of semantic expressions;

FIGS. 6A and 6B show LR parse tables of the connectable word ranges and grammar rules shown in FIGS. 3 and 4;

FIG. 11 shows a word candidate series (word lattice);

FIG. 12 shows variations of the state of analysis in processing word series;

FIGS. 14A and 14B show a series of words and another evaluation function and parameters regarding thereto;

FIG. 15 shows rules of word pair rules;

FIG. 16 shows grammar rules prepared by using the rules of words pair grammar shown in FIG. 15;

FIGS. 17A and 17B show a schematic structure of a speech recognition apparatus according to another embodiment, and word pair grammar used in this apparatus;

FIGS. 18A and 18B show a connection table designed for two-word connection and an example of connection processing using the connection table;

FIG. 21 is a timing chart illustrating pipeline processing for speech recognition and syntactic/semantic analysis;

FIG. 23 is a timing chart illustrating pipeline processing for speech recognition and syntactic/semantic analysis in the embodiment of FIG. 22; and FIG. 24 shows a relation between a relation between Japanese expressions and English expressions of examples.

DETAILED DESCRIPTION OF THE PREFERRED EMBODIMENTS

Figures 1A, 1B:
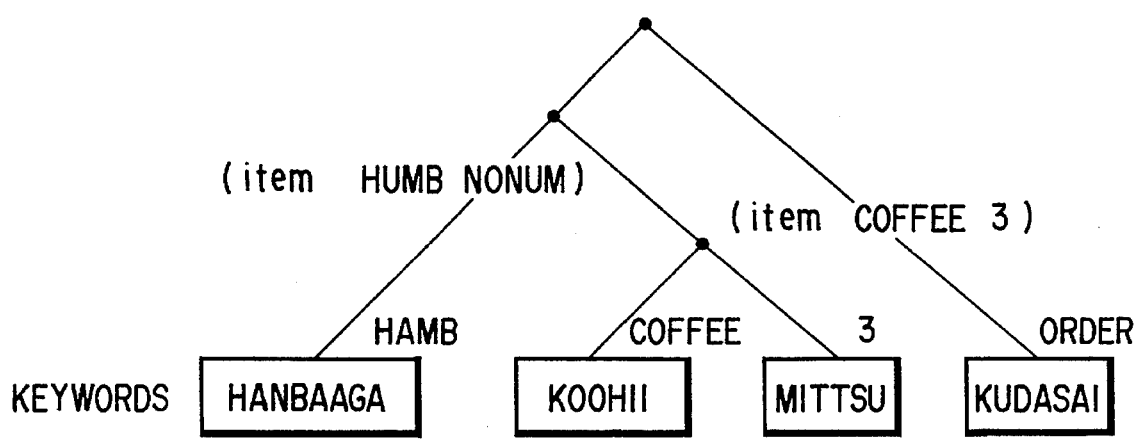
FIGS. 1A and 1B show examples of a sentence and a sub-sentence.

An embodiment of the present invention will now be described with reference to the accompanying drawings. It is supposed that a speech recognition apparatus of this embodiment is used to understand an order of article or item. The understanding of the order is the generating of semantic meaning of an input speech. For example, when a speech "EETO HANBAAGU TOO UUNTO KOOHI SANKO KUDASAI (er hamburger and uh coffee three please)" shown in FIG. 1A is input, the semantic expression, ((act ORDER) (item HUMB NONUM) (item COFFEE 3)), shown in FIG. 1B, is obtained by understanding the input speech. In order to understand the input speech, keywords needed for semantic expression are detected from the input speech, and syntactic and semantic analysis is performed to generate a semantic expression. The term "keywords" means "predetermined specific words needed for understanding a free speech to obtain a semantic expression". The term "sentence" means "a series of syntactically and semantically proper keywords included in a free speech". The term "sentence candidate" means "a series of keywords obtained as a result of sentence analysis". The term "sub-sentence candidate" means "a series of keywords capable of being parts of a sentence candidate". FIG. 1A shows examples of an input sentence, keywords, a sentence and a sub-sentence, and FIG. 1B shows a relationship between keywords and a semantic expression.

Figure 2:
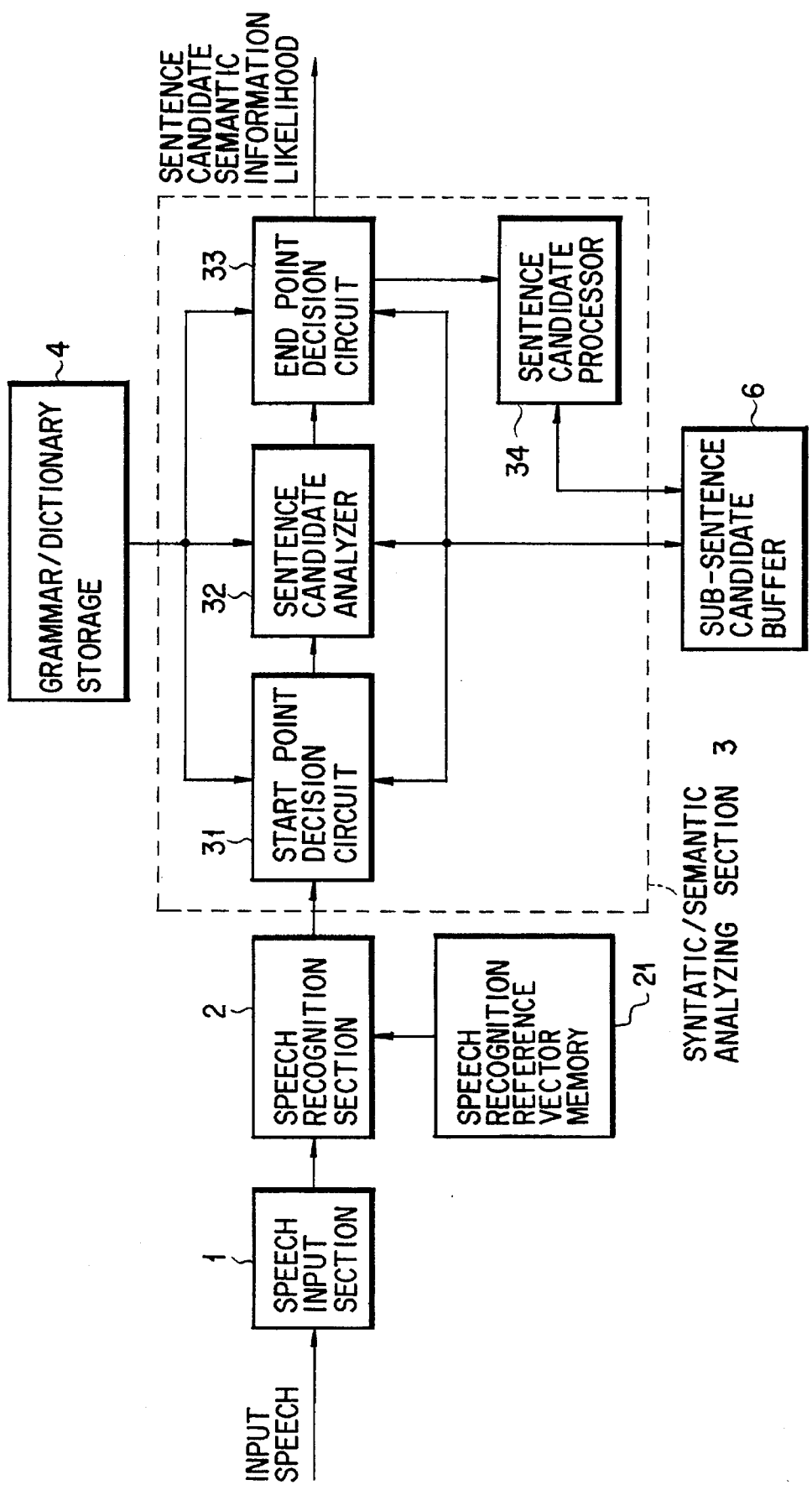
FIG. 2 shows schematically the structure of an embodiment of the present invention.

Referring to FIG. 2, the structure of the speech recognition apparatus according to the embodiment of the invention will now be described.

A speech input unit 1 converts an input speech signal, input through a microphone, etc., to a digital signal, subjects the digital signal to FFT (Fast Fourier Transform), filter analysis, LPC (Linear Predictive Coding) analysis, cepstrum analysis, etc., thereby generating a speech feature parameter series. The speech feature parameter series generated by the speech input unit 1 is sent to a speech recognition unit 2.

The speech recognition unit 2 is connected to a speech recognition reference vectors memory 21 being storing speech feature patterns of keywords corresponding to predetermined words to be recognized, for example, as shown in FIG. 3. and matches the speech feature parameter series with the reference vector in the speech recognition reference vector memory 21. In the case of the speech recognition by the word spotting method, the feature parameter series generated by the speech input unit 1 is successively matched with the reference vector in the speech recognition reference vector memory 21 in units of, e.g. an 8 msec frame cycle, without detecting the starting and end points of the input speech. The matching is performed by endpoint synchronism on the basis of feature parameters of a latest frame, with a range of allowance being provided on the position of the starting point of the word to respond to the variation in speech speed, in other words, a plurality of starting points being able to be provided. The word spotting method by continuous matching is described in detail in Japanese Patent Application No. 1-255270.

The recognition result of the speech recognition unit 2 is sent to a syntactic/semantic analysis unit 3 in the form of a series of temporally discrete words (i.e. word lattice). Each word of the word series has at least four data items, "start point", "end point", "likelihood" and "word name". The data item "likelihood", which indicates the possibility of words, may include "distance", "similarity" and "probability". Using the likelihood, the syntactic and semantic analysis, described below, is performed. The likelihood of a sentence candidate is found by an evaluation function.

FIG. 3 shows a word dictionary including keywords and examples of connectable word ranges (described below), and FIG. 4 shows examples of grammatical rules including rules for semantic analysis processing. These date items are stored in a grammar/dictionary memory unit 4.

FIG. 5 shows the form of a semantic expression. In FIG. 5, "act" means an action indicated by a speech. In this embodiment, "ODER" (meaning "KUDASAI (please)"), "APPEND" (meaning an additional order), and "DELETE" (meaning "IRANAI (not want)") are actions. On the other hand, "item" means an article, which consists of a combination of the name of an article and the number of articles. This combination is called "slot", and a semantic expression formed by a combination of "act" and "item" is called "frame". When the action and the number of articles are omitted in the input speech, "NOACT" and "NONUM" are expressed, and it is indicated in the semantic expression that no keywords relating to the action and the number of articles have been obtained by analysis. In addition, for example, some articles have different sizes. For example, there is an expression "KOORA (cola) S5: E5 L, M, S" in the dictionary, whereby the sizes of the article are indicated. In this case, when the designation of the size is omitted in the input speech "KOORA KUDASAI (cola please)", "NOSIZE" is indicated in the area of "SIZE".

Each time the speech recognition unit 2 detects a keyword, the keyword is input to the syntactic/semantic analysis unit 3. Thereby, the syntactic/semantic analysis unit 3 performs syntactic/semantic analysis by using syntactic and semantic data of the input sentence and grammar/dictionary data including temporal relationships, which is stored in the grammar/dictionary memory unit 4.

The analysis of the word series is performed on the basis of the time ranges between words included in the grammar/dictionary data, syntactic rewrite rules, and semantic consistency decision processing. Thus, a sub-sentence candidate and its semantic expression are obtained during the analysis, or a sentence candidate and its semantic expression are obtained after the analysis. The sub-sentence candidate obtained during the analysis is stored in a sub-sentence candidate buffer 6. In parallel with the analysis, the evaluation values of the entire sub-sentence candidate and sentence candidate are obtained from the evaluation function on the basis of the distance, similarity and probability of the likelihood data items of words constituting the candidates. It is possible to use, as the evaluation function, a sum value, a function value and logarithm value obtained by considering the weighting of the word likelihood.

Figure 6B:
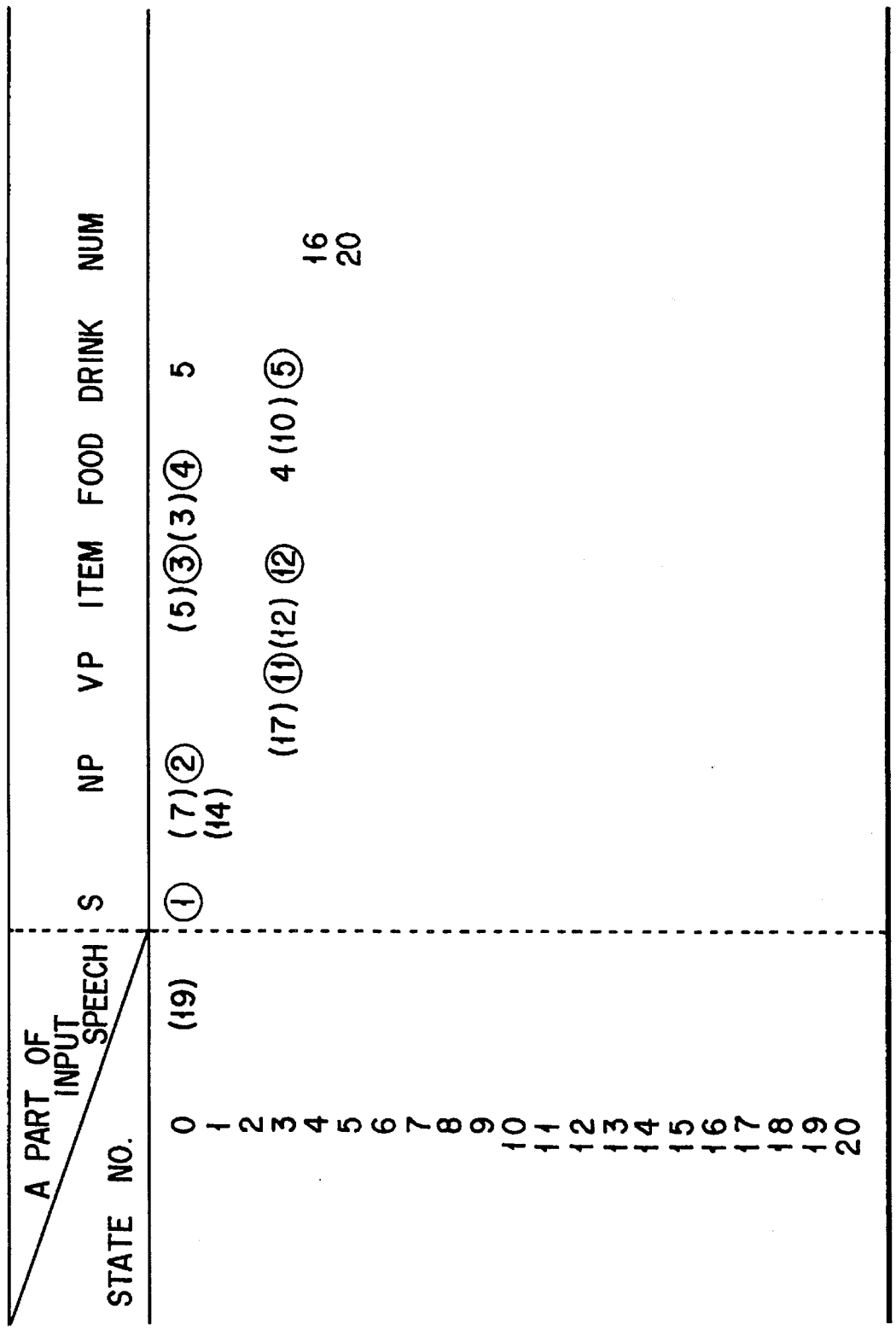

The syntactic analysis method used in the syntactic/semantic analysis unit 3 is based on, e.g. the Tomita method (M. Tomita, "An efficient Word Lattice Parsing Algorithm for Continuous Speech Recognition", Proc. ICASSP '86, pp. 159–1572, Nov., 1986). In this method, however, the Tomita method is modified such that while the temporal connection relationship and syntactic connection relationship of temporal discrete keywords are analyzed, the semantic expression of the analyzed keyword series can be generated. Syntactic grammar/dictionary data are converted to an LR parse table in advance, and the syntax of the keyword series can be quickly analyzed by referring to the LR parse table. The LR parse table may be provided with a processing reference function for performing temporal relationship decision processing and semantic expression generation processing simultaneously with referring to the LR parse table. In this context, this analysis method is called a keyword lattice LR (KLLR) analysis method. FIG. 6 shows an LR parse table converted from the word dictionary and grammar rules shown in FIGS. 3 and 4. The LR parse table, in place of the contents shown in FIGS. 3 and 4, is stored in the grammar/dictionary memory unit 4. In addition, a transverse syntax analysis method, such as an Early's algorithm or chart method, is applicable to a top-down method and a bottom-up method. If there is no need to perform pipeline processing from word recognition to syntax analysis, a depth-first syntax analysis method can be adopted. In any case, the method used in the syntactic/semantic analysis unit 3 differs from the conventional syntactic analysis method in that the connectability of all temporally discrete keyword candidates is analyzed in parallel (breadth-first analysis) in the syntactic/semantic analysis of word candidates.

The grammar/dictionary memory unit 4 stores dictionary data representing the relationship between parts of speech and word names of an input sentence received by the syntactic/semantic analysis unit 3, syntactic rewrite rules of series of parts of speech, data relating to processing for deciding semantic appropriateness of word series of parts of speech, data relating to generation of semantic expressions, and data relating to temporal relationship between parts of speech. The syntactic rewrite rules are written according to context free grammar or regular grammar. The grammar rules shown in FIG. 4 are augmented to treat semantic data other than data relating to parts of speech, and the expanded portions contain processing procedures for semantic analysis. It is possible that the word name is regarded as identical to the part of speech, and the syntactic/semantic analysis dictionary is written and the syntactic/semantic analysis is performed on the basis of word names. When the KLLR analysis method is used, the dictionary/grammar data shown in FIGS. 3 and 4 is used in advance for processing reference for temporal relationship decision processing and semantic expression generation processing, is converted to an LR parse table as shown in FIG. 6, and is stored in the grammar/dictionary memory unit 4 shown in FIG. 2. In each case, the necessary grammar/dictionary data is stored in the grammar/dictionary memory unit 4 according to the syntactic/semantic analysis method.

The syntactic/semantic analysis unit 3 comprises a sentence start point determining unit 31, a sentence candidate analysis unit 32, a sentence end point determining unit 33 and a sentence candidate processing unit 34. The sentence start point determining unit 31, sentence candidate analysis unit 32, and sentence end point determining unit 33 are connected in this order, and the sentence candidate processing unit 34 is connected to the sentence end point determining unit 33. The sentence start point determining unit 31, sentence candidate analysis unit 32, and sentence end point determining unit 33 are connected to the grammar/dictionary memory unit 4, and are supplied with grammar/dictionary data necessary for analysis from the grammar/dictionary memory unit 4. In addition, the sentence start point determining unit 31, sentence candidate analysis unit 32, sentence end point determining unit 33, and sentence candidate processing unit 34 are connected to the sub-sentence candidate buffer 6 for storing sub-sentence candidates for unfinished analysis. The analysis data during analysis is stored and referred to, via the buffer 6.

The sentence start point determining unit 31 determines whether the word candidate received from the speech recognition unit 2 can be a top word of a sentence by referring to syntactic data stored in the grammar/dictionary memory unit 4. When the word candidate can be the top word of the sentence, the semantic expression is generated as a sub-sentence candidate and this sub-sentence candidate and its semantic expression are stored in the sub-sentence candidate buffer 6. In the case of the KLLR analysis method, it can be determined, by referring to the LR parse table composed of grammar, whether the word candidate can be a top word of a sentence. FIG. 6 shows an LR parse table formed on the basis of the contents of the grammar/dictionary memory unit 4. In this table, words (HANB, CHEESEB, POTATO, COFFEE, COLA), among all recognition words, written at state number 0 in the vertical axis can be top words of sentences. In this case, no processing is performed on word candidates which cannot be top words of sentences.

The sentence candidate analysis unit 32 performs syntactic/semantic analysis of combinations of all analyzed sub-sentence candidates in the sub-sentence candidate buffer 6, except candidates newly prepared by the sentence start point determining unit 31, and all word candidates input to the syntactic/semantic analysis unit 3. In the KLLR analysis method, while the aforementioned LR parse table is referred to, it is determined whether combinations of the sub-sentence candidates and words are grammatically connectable, and sub-sentence candidates are newly added to the sub-sentence candidate buffer 6. In parallel with the syntactic/semantic analysis, syntactic trees and semantic expressions are generated and the likelihood of sub-sentence candidates are evaluated and added to the sub-sentence candidate buffer 6.

The sentence end point determining unit 33 determines, by utilizing the grammar/dictionary memory unit 4, whether each of all sub-sentence candidates in the sub-sentence candidate buffer 6 is established as a sentence. In the LR parse table shown in FIG. 6, a symbol ($) representing a sentence end point is imaginarily connected to a sub-sentence candidate and it is determined whether the sub-sentence candidate is acceptable as a sentence. If the sub-sentence candidate is acceptable as a sentence, the semantic expression and evaluation value of the sub-sentence candidate are output.

The sentence candidate processing unit 34 performs management of the candidates stored in the sub-sentence candidate buffer 6. Each time the processing of one input word by the sentence start point determining unit 31, sentence candidate analysis unit 32, and sentence end point determining unit 33 is completed, the sentence candidate processing unit 34 deletes the sub-sentence candidates stored in the sub-sentence candidate buffer 6 when these candidates have lengths greater than that of a maximum sentence candidate length SL. Thereby, processing of a candidate which does not appear in a normal speech is not performed. Thus, continuous syntactic/semantic analysis can be performed by utilizing the sub-sentence candidate buffer 6 with a limited size, and analyzed semantic expressions are output successively. In this context, the maximum sentence candidate length SL may be either a temporal length or a length in the number of words. When the length SL is the temporal length, a time period between start and end points of a sub-sentence candidate is compared with the maximum sentence candidate length SL. When the length SL is the length in the number of words, the number of words constituting the sub-sentence candidate is compared with the maximum sentence candidate length SL. Thus, the number of sub-sentence candidates is reduced.

Outputs relating to sentence candidates, their likelihoods and their semantic expressions are fed into a speech language analysis apparatus or a speech dialogue apparatus, and processing such as data base management is performed on the basis of the contents of an input dialogue or speech.

Next, the operation of the speech recognition apparatus according to the above embodiment will now be described.

When a speech signal is input to the speech input unit 1 via a microphone, etc., the speech signal is converted to a digital signal. The digital signal is subjected to various processing such as FFT, filter analysis, LPC analysis, and cepstrum analysis and is output as a speech feature parameter series. At this time, speech feature parameters of, e.g. a 16 channel filter bank output are calculated in every predetermined time interval of 8 msec, and a speech feature parameter series is output to the speech recognition unit 2.

Figure 7:
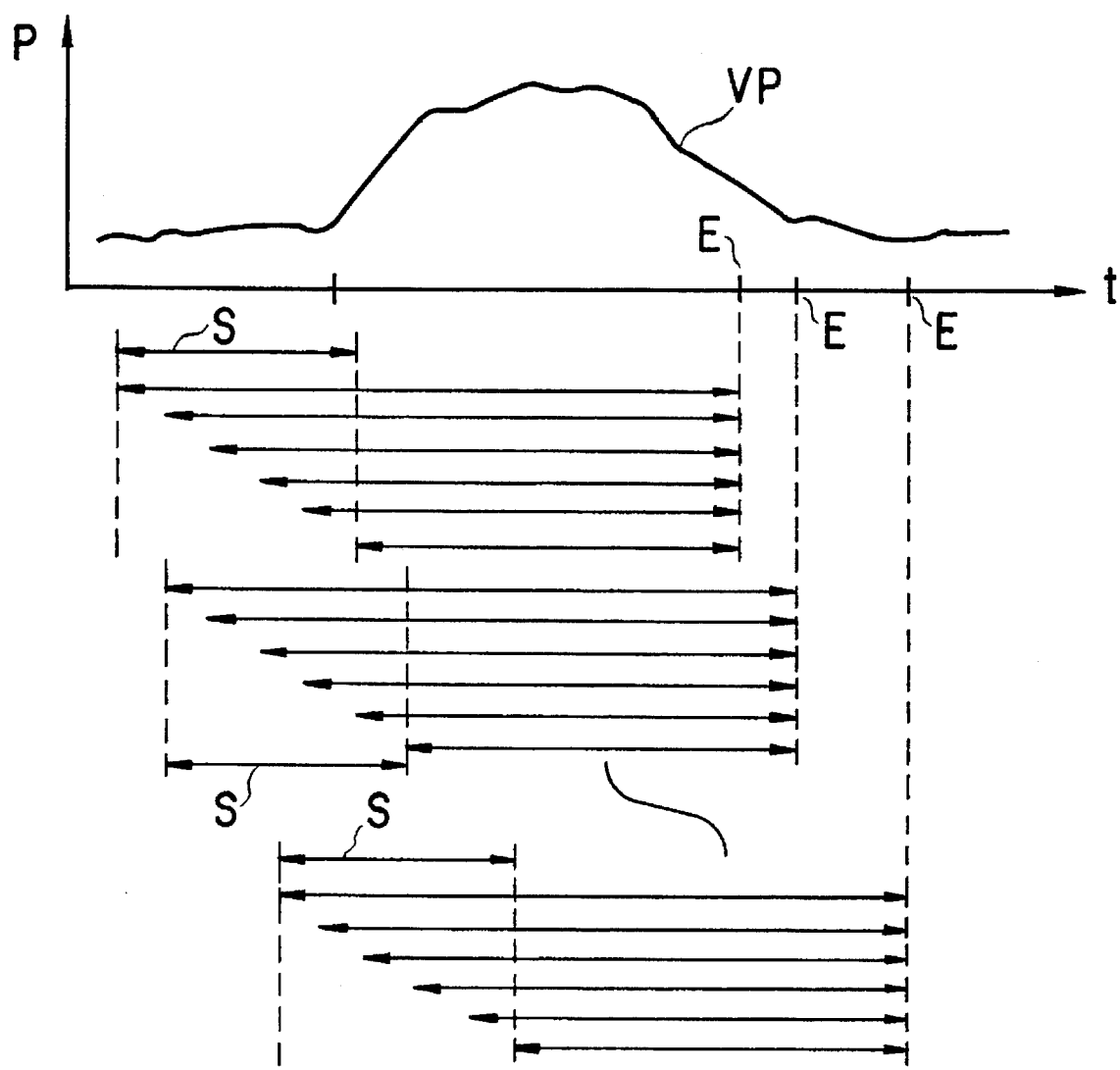
FIG. 7 illustrates an example of an output of a speech recognition unit.

In the speech recognition unit 2, matching between the contents of the speech recognition dictionary memory 21 of words to be recognized (shown in FIG. 3) and the speech feature parameter series is performed according to the word spotting method. In the word spotting method, matching of continuous speech patterns VP, as shown in FIG. 7, is successively performed. Specifically, it is supposed that each of end points of analysis frames of feature parameter series obtained by analyzing the speech signal input from the speech input unit 1 is E, and a start point candidate period of start points which meet speech period conditions for recognition matching words is S. The feature parameter series of provisional speech periods indicated by these start points are resampled in the time-axis direction, and feature vectors of a predetermined number of orders, having different speech periods, are found with the end point E used as a reference point. In this way, while the end point E is shifted in the time-axis direction in units of, e.g. 8 msec, the feature vectors are successively extracted and the likelihood of each feature vector and the contents of the speech recognition reference vector memory 21 is found. Further, from the likelihood series obtained with respect to each feature vector, a speech feature vector representing a maximum likelihood and start point data for each category are found.

Figure 8:
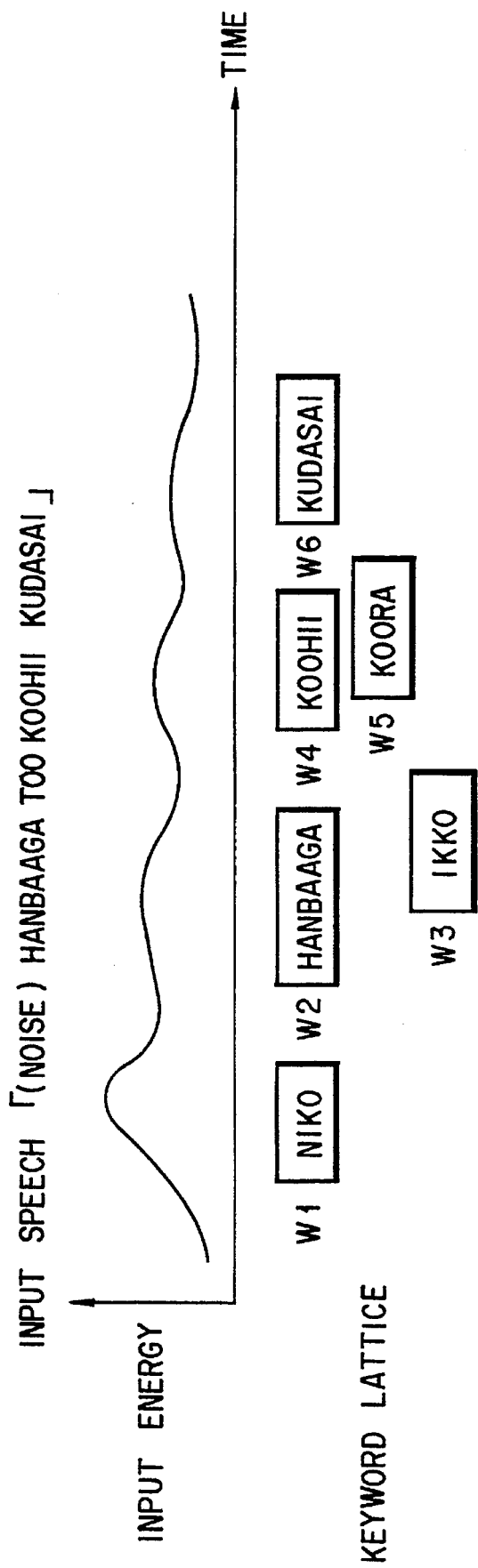
FIG. 8 shows an input lattice.

The word spotting is thus performed, and a keyword series of word candidates of W1 to W6, as shown in FIG. 8, is obtained. The word candidates recognized in the speech recognition unit 2 are output to the syntactic/semantic analysis unit 3.

Figure 9:
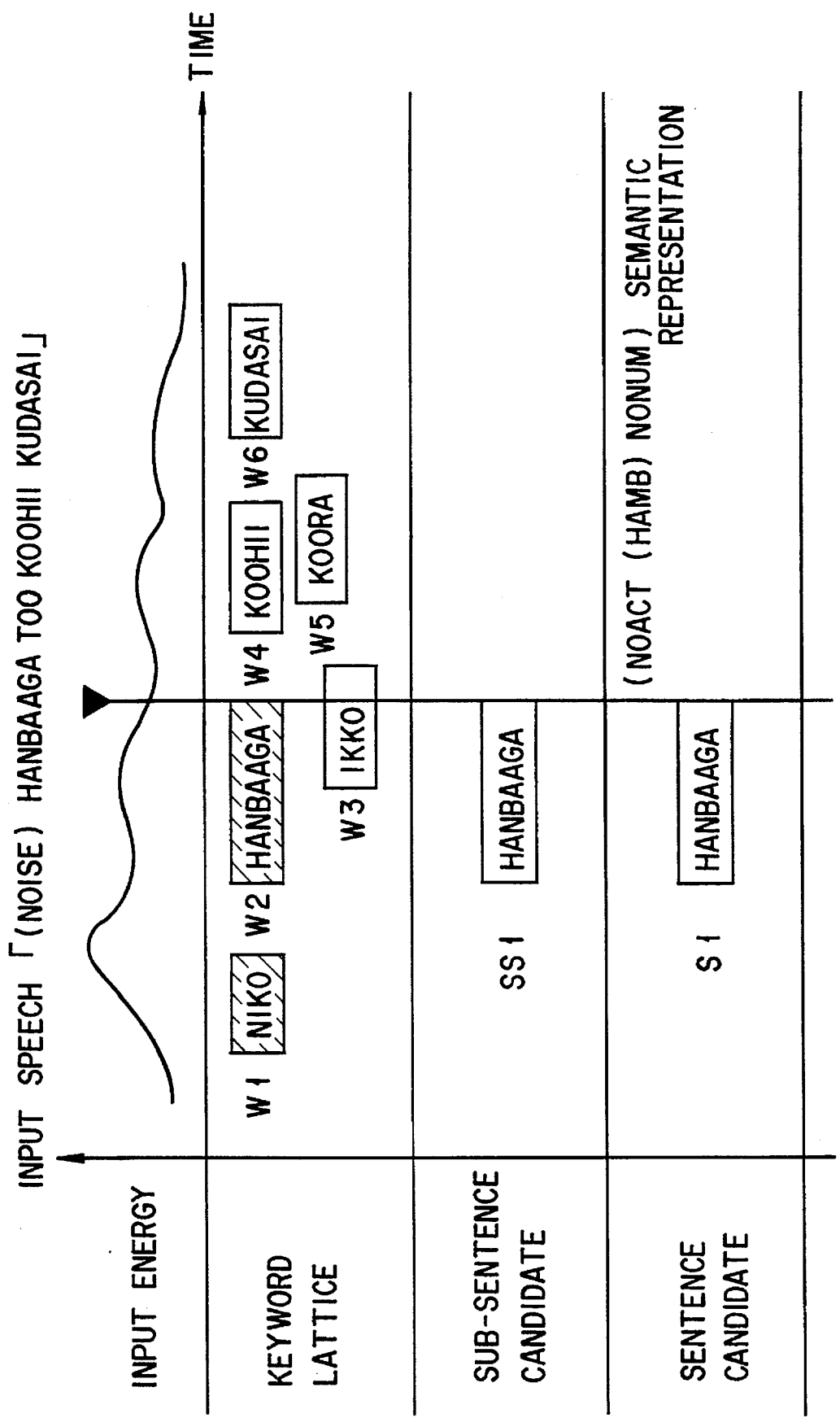
FIG. 9 shows analysis processing.

The sentence start point determining unit 31 determines whether the word candidate can be a top word of a sentence, on the basis of syntactic data. In the LR parse table of FIG. 6, the words (HAMB, CHEESEB, POTATO, COFFEE and COLA) whose actions are stated at the vertical-axis No. 0, among all words to be recognized, can be top words. In the example of the word lattice shown in FIG. 8, W1 "NIKO (two)" cannot be a top word, but W2 "HANBAAGA (hamburger)" can be a top word. Thus, an analysis stack having W3 as a top word is generated, and W2 is stored in the sub-sentence candidate buffer 6 a sub-sentence candidate 6. FIG. 9 shows an example of the state of this analysis processing.

The sentence candidate analysis unit 32 performs temporal connection decision and syntactic/semantic analysis of combinations of all analyzed sub-sentence candidates in the sub-sentence candidate buffer 6, except candidates newly prepared by the sentence start point determining unit 31, and all word candidates input to the syntactic/semantic analysis unit 3.

Figure 10A:
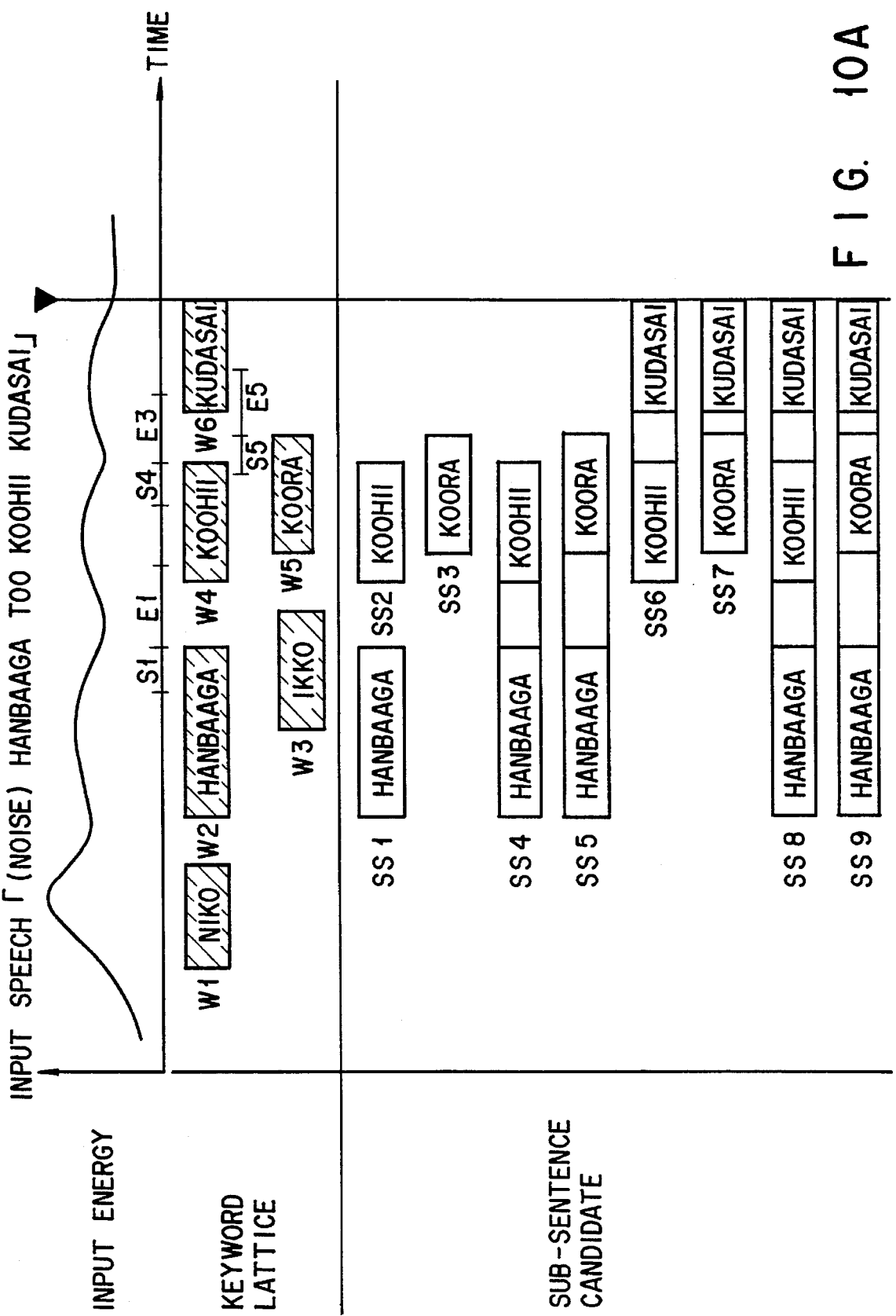
FIGS. 10A and 10B show other analysis processing.
Figure 10B:
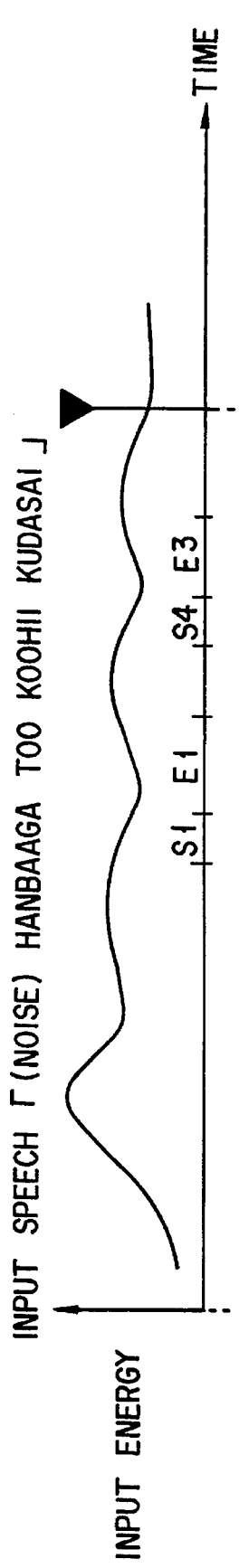

Temporal connection possibility is decided by using data relating to end points of each sub-sentence candidate and start points of each word. In this case, temporal overlapping and a distance between both points of the sub-sentence candidates are allowed to a certain extent. For example, overlapping is set at 100 msec, and a distance is set at 400 msec. Of course, these values may be set for each word. At this time, by appropriately setting the distance between connectable words, sub-sentence candidates are generated and analysis is processed, excluding, e.g. meaningless words such as "ANOO (er)" and "EETO (uh)", non-verbal noise, environment noise, out-of-vocabulary words, muttering and erroneous recognition words relating to muttering. In FIGS. 10A and 10B, with respect to sub-sentence candidates SS1 to SS5, the connectable word range with W6 "KUDASAI (please)" is determined, and it is determined whether the start end point of W6 is present in the range of (S4, E4) of W4 and the range of (S5, E5) of W5. In this example, "KUDASAI (please)", "KOOHI (coffee)" and "KOORA (cola)" are connectable.

Another example of judgment of temporal connectability will now be described.

FIG. 11 shows the case where speech "HANBAAGA TOO EETO KOOHI WO KUDASAI (hamburger and, er, coffee please)" is input, and word candidates W1 to W6 are given by the speech recognition unit 2. In this case, it is assumed that the start point of a word connectable with W1 "HANBAAGA (hamburger)" is present in a period between S1 and E1, with the end point of W1 "HANBAAGA (hamburger)" used as a reference point. This is assumed by considering a time length not occupied by keywords ("HANBAAGA (hamburger)", "KOOHI (coffee)", "KUDASAI (please)", in FIG. 11) necessary for understanding the semantic content of the sentence of the speech including unnecessary words. In this example, the start points of w2 "IKKO (one)", W3 "NIKO (two)" and W4 "KOOHI (coffee)" are present in the period between S1 to E1, and these words are decided to be connectable with w1 "HANBAAGA (hamburger)" from temporal relationship. If these words are also decided to be connectable from grammatical aspects, sub-sentence candidates of W1 and W2, W1 and W3, and W1 and W4 are generated.

The KLLR analysis method has the above-described temporal connection judgment function. Thus, temporally discrete keyword series can be analyzed, unlike the conventional analysis method. Further, since there is only one analysis stack in the conventional analysis method, analysis of sub-part of an entire input cannot be performed by the conventional method. However, in this example, an analysis stack is generated whenever a keyword candidate able to be a top word of a sentence is detected. Thus, analysis of part of an input can be performed, and syntactic and semantic analysis of an input excluding, e.g. meaningless words such as "ANOO (er)" and "EETO (uh)", non-verbal noise, environment noise, out-of-vocabulary words, and muttering can be performed.

FIG. 12 shows an example of connectability decision by use of syntactic/semantic analysis, and specifically shows the variation of the analysis state in the case where a series of "HANBAAGA (hamburger)", "KOOHI (coffee)" and "KUDASAI (please)" is processed by using the LR parse method of FIG. 6. In FIG. 6, accompanying letters indicate processing numbers. Symbol "Sn" in the LR parse table indicates a shift to state number n, and "rm" indicates reduction by use of grammar rule m. A semantic expression is generated in accordance with progress of analysis, and the likelihood of a sub-sentence candidate is found from the likelihood of an input word. In this description, the evaluation of the likelihood is not described in detail, but the syntactic/semantic analysis processing is described in detail.

In the grammar table of FIG. 4, semantic expression generating processes are written in expanded areas of the grammar rules. "X0" represents a semantic expression generated after grammar rules are applied. In the case of grammar number (9), <ITEM>: : =<FOOD>, X0=ms (X1, NONUM) means that the slot of an article of FOOD is generated with the number of articles unfixed. In addition, mf () indicates generation of a frame. The frame means a semantic expression of a syntactic sentence, and the slot means structural elements of the frame. In the example of FIG. 12, (ORDER (HAMB NONUM)(COFFEE NONUM)) is generated, and this means that "order an unspecified number of hamburgers and an unspecified number of cups of coffee."

In the above example, only one series of "HANBAAGA (hamburger)", "KOOHI (coffee)" and "KUDASAI (please)" was described. In the case of FIG. 10, however, sub-sentence candidates SS1 to SS9 during analysis may be subjected to similar processing, and a semantic expression is obtained for each sentence candidate.

After the above syntactic/semantic analysis, the sentence end point determining unit 33 determines, by using the grammar dictionary 4, whether the respective sub-sentence candidates in the sub-sentence candidate buffer 6 are established as sentences. If the candidates are established as sentences, the likelihoods and semantic expressions of the sentence candidates are output as decision results.

When there is a possibility that analysis of a candidate needs to be progressed by using a word which will appear in the following frame(s) because of grammatical fuzziness, the original candidate is duplicated and stored in the sub-sentence candidate buffer 6.

The sentence end point determining unit 33 determines whether each sub-sentence candidate is established as a grammatically perfect sentence. In the case of the KLLR analysis method, a sentence-kind symbol ($) is attached to each sub-sentence candidate and the candidate is analyzed according to the LR parse table. When an action "acc" representing the acceptance of a sentence is obtained, the candidate is decided to be a complete sentence. By successively performing this processing, the sentence candidate decided to be a complete sentence and the semantic expression and likelihood of the sentence candidate are successively output. Thus, data of sentences is output in the form of lattice.

The sentence candidate processing unit 34 deletes, from the sub-sentence candidate buffer 6, those sub-sentence candidates left in the buffer 6, which have a temporal length greater than a predetermined temporal length LMAX. Thereby, the sub-sentence candidates, to which word candidates to be recognized later cannot be connected, can be deleted, and this deleting process is successively performed in the sub-sentence candidate buffer 6 having a limited memory area.

In this manner, non-verbal noise, out-of-vocabulary words, environment noise, ellipsis, silent periods and continuous sentences can be treated using only temporal discrete keywords, although it is difficult for the conventional method to treat these. The word lattices are syntactically and semantically analyzed, and, in the example of FIGS. 10A and 10B, sentence candidates S1 to S9 are obtained.

Figures 13A, 13B:
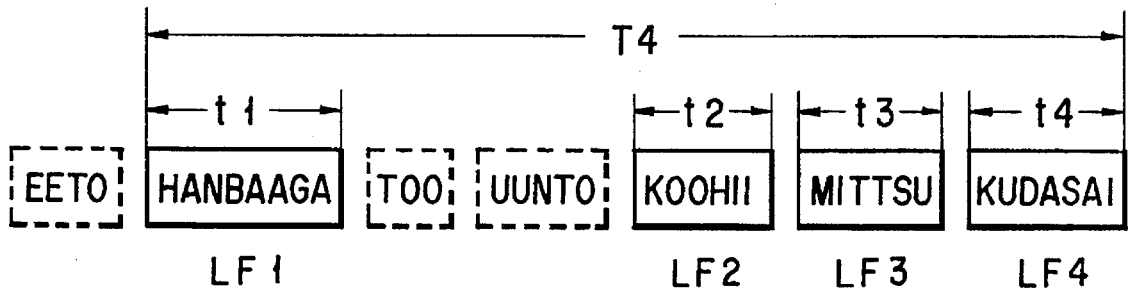
FIGS. 13A and 13B show an example of a series of words and an evaluation function and parameters regarding thereto.

Next, an example of evaluation function will now be described by referring to the word series as shown in FIG. 13A. In this example, the likelihood of "HANBAAGA (hamburger)" is $LF_1$ and the time period thereof is $t_1$. The likelihoods and time periods of "KOOHI (coffee)", "SANKO (three)" and "KUDASAI (please)" are, respectively, $LF_2, t_2$; $LF_3, t_3$; and $LF_4, t_4$. The time period between the start point of the sentence, i.e. the start point of "HANBAAGA (hamburger)", and the end point of the sentence, i.e. the end point of "PLEASE" is $T_4$. The number N of words is 4. In the example of FIG. 13B, $(LF_1+LF_2+LF_3+LF_4)/4+\alpha*(t_1+t_2+t_3+t_4)/T_4$ is the likelihood $TLF_4$ of the sentence. The term of $(\Sigma t_i)/T_N$ represents the ratio of a time period of a word to a time period of a sentence. This ratio increases as the distance between the words of the sentence increases. When there are meaningless words in the sentence, the ratio takes a maximum value of 1. This ratio is used to evaluate the temporal relationship between words of a sentence, and is weighted by a coefficient $\alpha$. This coefficient $\alpha$ is set at an experimentally optimal value. For example, the optimal coefficient can be determined by an optimal likelihood guess method or a neural net method, with use of leaning data by which a word interval is determined by speech.

FIGS. 14A and 14B show a series of words and another evaluation function regarding thereto. In this example, the likelihood of periods not to be recognized is included in x-evaluation. This method, as applied to HMM (Hidden Markov Model), is described in detail in the document, J. Wilpon, "Improvements and Application for Key Word Recognition using Hidden Markov Modeling Techniques", ICASS91, 309–312, November 1991. In the example of FIG. 14B, an evaluation function is used wherein the likelihood $LF_i$, $i+1$ of a word series to be recognized and the likelihood $LF_i'$ of a period not to be recognized, which are weight by a weight $\beta$, are integrated to obtain an evaluation value. In addition, the weight $\beta$ may be set individually for each period, depending on the conditions (e.g. word names). In all examples, evaluation is made on the basis of the likelihoods of words to be recognized and periods not to be recognized, part or all of a continuous time period, and their mutual relationship, thereby exactly obtaining words to be recognized in a speech.

As stated above, while temporal connection relationship between word candidates is being examined, word pair grammar using words used lastly by the sub-sentence candidate for analysis and a word input to the syntactic/semantic analysis unit 3 and analyzed currently is applied simultaneously with the syntactic/semantic analysis. Thereby, the amount of calculations needed for analysis can be reduced. An example of this structure is shown in FIG. 17A. A word pair determining unit 34 is provided in front of the sentence candidate analysis unit 32. Prior to the sentence candidate analysis, the word pair determining unit 34 determines, by using word pair grammar (described below), the relationship between the word currently analyzed and the last word of each sub-sentence candidate stored in the sub-sentence candidate buffer 6. When a certain sub-sentence candidate is connected on the basis of the decision result, the candidate is analyzed by the sentence candidate analysis unit 32. When a sub-sentence candidate is not connected on the basis of the decision result, the sentence candidate is not analyzed and the sentence end point is determined. This processing is performed for all sub-sentence candidates. Since the decision according to the word pair grammar can be performed more easily than the decision by the sentence candidate analysis unit 32, analysis of unnecessary sentence candidates is reduced and the syntactic/semantic analysis processing can be performed more efficiently.

FIG. 15 shows examples of the word pair grammar. For example, "%xoff" means suspension of analysis of a series of combined words "LEFT RIGHT . . . " FIG. 16 shows examples in which rules shown in FIG. 15 are used. In "%xoff" of number "1" in a circle, the same article name is not repeated (e.g. "HANBAAGA (hamburger)" and "HANBAAGA (hamburger)"). In "%xoff" of number "3" in a circle, the same number of articles is not repeated (e.g. "IKKO (one)" and "IKKO (one)"; "NIKO (two)" and "NIKO (two)"). In "%xclr" and "%xonr" of number "4" in a circle, "ZUTU" is connected to a number of articles, such as "IKKO (one)", "ZUTU" or "YOTTSU (four)", "ZUTU". For example, since there is no such order as "HANBAAGA TOO HANBAAGA WO KUDASAI (hamburger and hamburger, please)" as an input in the case of grammar and dictionary shown in FIG. 17B, the grammar of number "1" in a circle is effective. When such word pair grammar cannot be used, it is necessary to write individual rules in the grammar and the grammar is complicated.

Figure 18B:
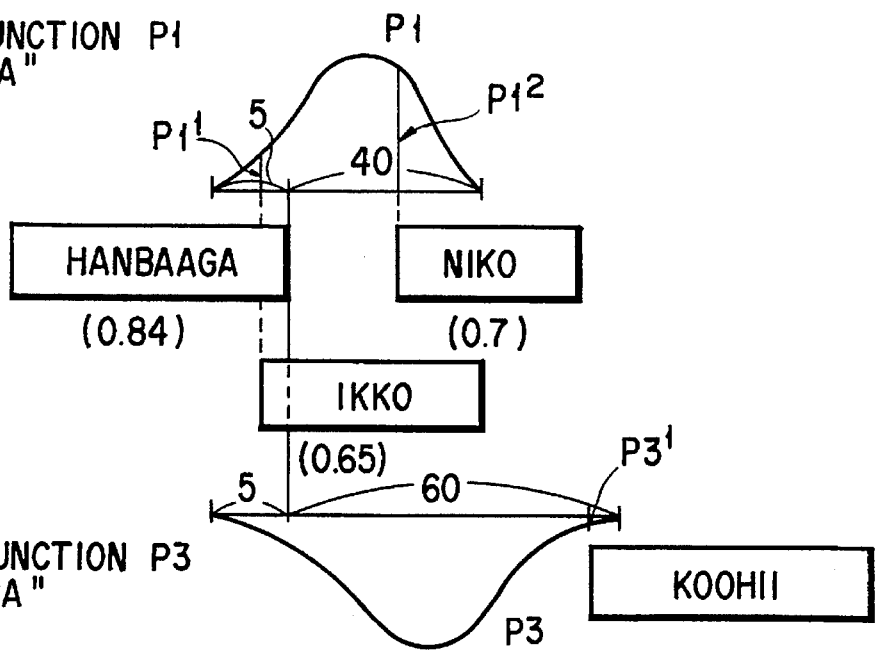

Further, it is possible to give right-and-left continuity, which is general in Japanese form analysis, to words to be recognized, refer to connection a buffer written according to their properties, and decide connectability of words. FIG. 18A shows a connection table, in which two-word connection is considered. In this buffer, one item includes "left word name", "right word name", "left end point position", "right end point position", "word connection degree function", "likelihood threshold of left word" and "likelihood threshold of right word". These data elements are stated for each word pair. FIG. 18B shows decision processing in the case of using the connection table of FIG. 18A. In this example, the word "HANBAAGA (hamburger)" is processed. For example, in the case of "HANBAAGA (hamburger)" and "IKKO (one)", "IKKO (one)" is a word belonging to "NUM" (number of articles), and the right end point of "HANBAAGA (hamburger)" is used as a reference point. These words are connected in a period of (−5, 40) with a connection function P1. It is indicated in the table of FIG. 18A that "HANBAAGA (hamburger)" requires a likelihood of 0.8 or above and "IKKO (one)" requires a likelihood of 0.6 or above. When the likelihood of input "HANBAAGA" is 0.84 and that of "IKKO" is 0.65, these likelihoods are above the thresholds. When the right end point of "HANBAAGA" is used as a reference point, the left end point of "IKKO" is present in the period of (−5, 40). Therefore, "HANBAAGA" and "IKKO" are connectable. Further, when the connection degree of "IKKO" is found on the basis of the connection degree function P1, the connection degree is P11 and the likelihood of the word series of "HANBAAGA" and "IKKO" is (0.84+P12*0.7)/2. In this likelihood, 1/2 means averaging by the number of words "238 . This is equivalent to the first term of FIG. 13B or FIG. 14B. In this manner, in the word connection decision, not only the possibility/impossibility of connection but also the connection degree of two words is considered. Thus, the time interval between words and the combination of words can be considered in the evaluation function. Further, when analysis is performed on the basis of the grammar data as shown in FIGS. 4 and 6, it is possible to determine a connection function for each grammar rule and incorporate the connection function in the evaluation function.

As has been stated above, by using not only the temporal relationship between two words but also the connection degree and connection period between temporally discrete words to be decided, the sub-sentence candidates can be analyzed, excluding meaningless words, non-verbal noise, our-of-vocabulary words, muttering, etc. In addition, the likelihood of the sub-sentence candidate can be evaluated by considering local features of the sub-sentence candidate, e.g. a phenomenon wherein the possibility of muttering is higher in the word series of "HANBAAGA (hamburger)" and "KOOHI (coffee)" than in the word series of "HANBAAGA (hamburger)" and "NIKO (two)", or a phenomenon wherein the possibility of muttering is low before words meaning actions (e.g. "KUDASAI (please)", "IRIMASEN (not want)"), as in wordings "HANBAAGA KUDASAI (hamburger please)" or "HANBAAGA IRIMASEN (not want hamburger)". Thus, analysis can be performed with high precision. In addition, the amount of processing can be reduced, without lowering precision, by processing only the sub-sentence candidates with high evaluation values ("beam search method").

In this embodiment, the range of connection of the right word is limited by employing the left word as a reference point, but the right word can be employed as a reference point. Although the two-word combination was handled in the above, a combination of three or more words can be evaluated.

In order to prevent an extreme increase in the number of sub-sentence candidates, the quantity of calculations must be decreased. For this purpose, some evaluation functions are applied to all sub-sentence candidates to evaluate these candidates. Based on the evaluation result, the candidates are sorted and those candidates which have low evaluation values and fall out of the scope of predetermined candidates (beam width) are deleted. This processing is utilized for the analysis processing in which a word recognized based on an input of the next or following frame is used.

Figure 19:
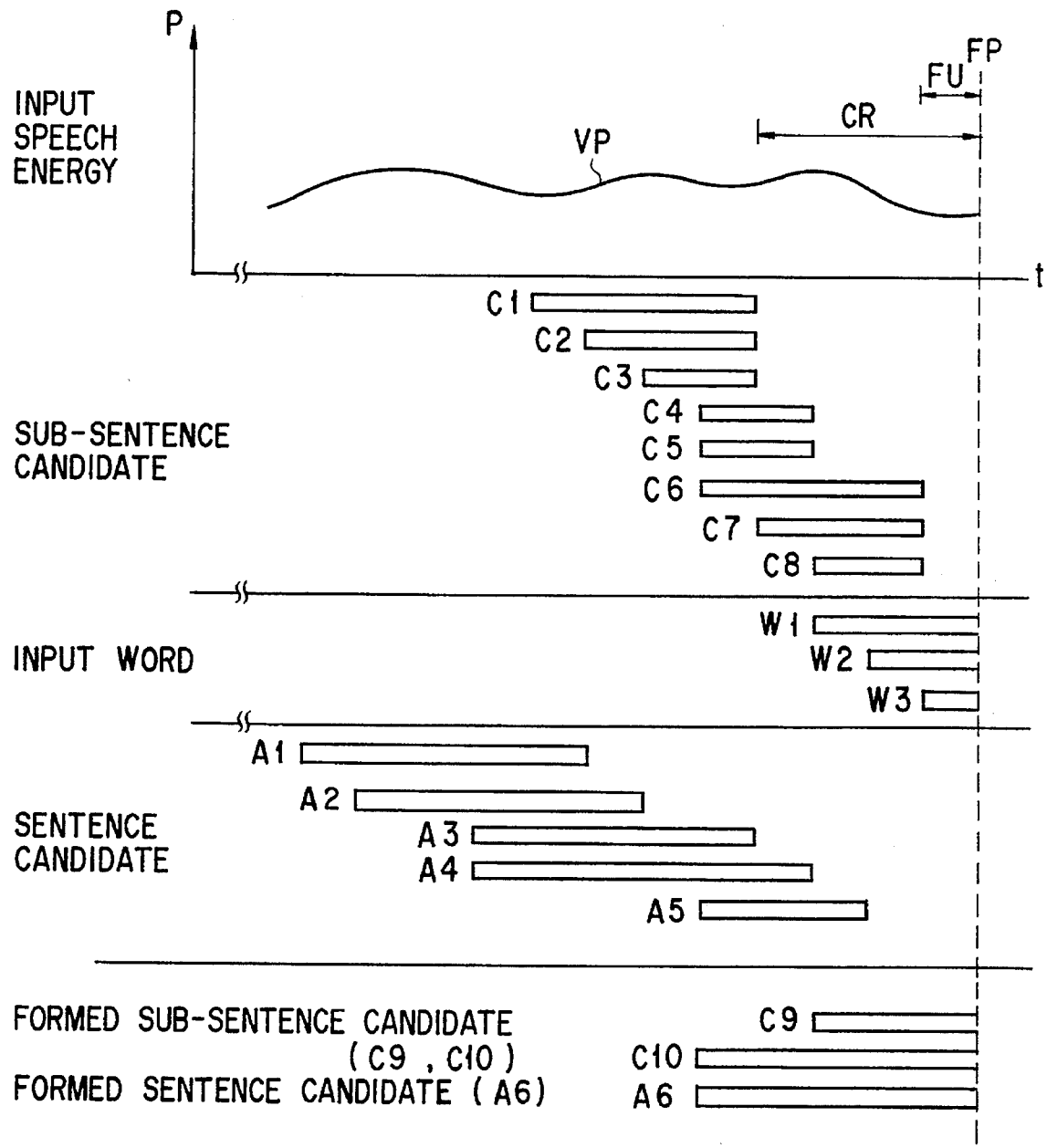
FIG. 19 shows data processed by a syntactic/ semantic analysis unit.

FIG. 19 shows the concept of the timing of data processed by the syntactic/semantic analysis unit 3. In FIG. 19, VP indicates input speech energy varying with time, FP a present analysis time point, and FU a frame length which is a minimum analysis unit. In addition, W1 and W3 indicate word candidates recognized at present, C1 to C8 sub-sentence candidates now under analysis, and A1 to A5 processed sub-sentence candidates output as established sentences. In FIG. 19, if word candidate W1, for example, is a word capable of being a top word of a sentence, a new sub-sentence candidate C9 having word W1 as its top word is generated. If a sub-sentence candidate C6 and a word candidate W3 are decided to be connectable as the result of syntactic/semantic analysis, the sub-sentence candidate C6 is duplicated and generated as a sub-sentence candidate C10. Further, if the last word candidate W3 of the sub-sentence candidate 10 is capable of being a last word of the sentence, the sub-sentence candidate C10 is duplicated and output as a sentence candidate A6. In FIG. 19, CR denotes a range of existence of sub-sentence candidates, which is defined from the present analysis time point FP. Sub-sentence candidates having end points outside the range CR are deleted. When the word candidates W1 to W3 recognized at present have completely been analyzed, the analysis time point FP is increased by an increment of one for the next processing.

Figure 20:
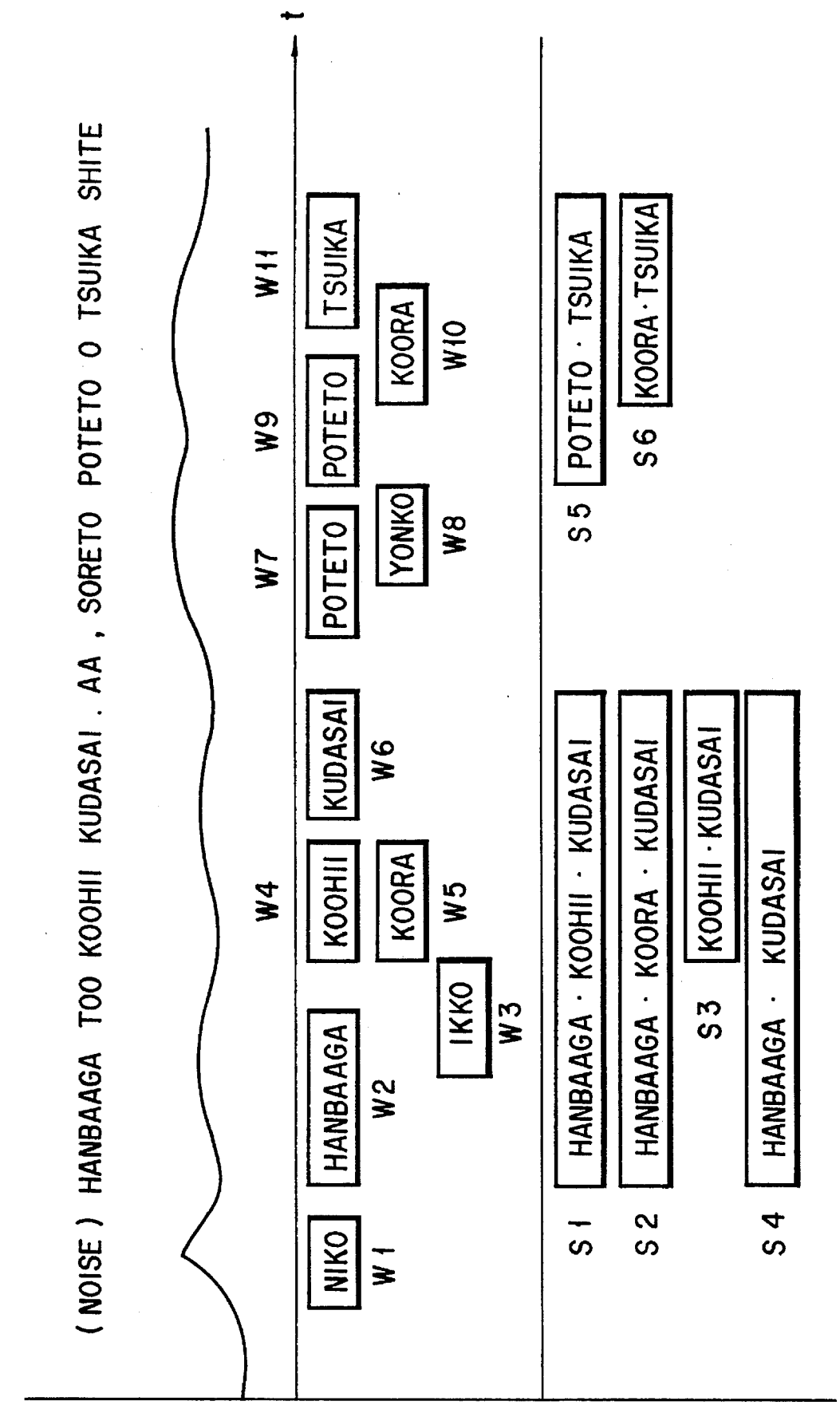
FIG. 20 illustrates a specific example of syntactic analysis.

An example shown in FIG. 20 will now be described. In this example, two sentences, "HANBAAGA TOO KOOHI KUDASAI. AA, SORETO POTETO WO TSUIKA SHITE (hamburger and coffee please. er, and potato too.)", are successively pronounced and noise appears at the top of the sentence.

It is supposed that recognized word candidates W1 to W11 are given in the speech recognition unit 2. The word candidates W1 to W11 are subjected to syntactic/semantic analysis in the syntactic/semantic analysis unit 3 according to the above-described method. Specifically, the sentence start point determining unit 31 determines whether or not the word candidates are capable of being top words, by referring to the LR parse table containing syntactic/semantic data. First, "HANBAAGA" (W2) is determined to be a possible top word. Then, the start point of the word connectable to the "HANBAAAGA" (W2) is examined. In this case, if the "KOOHI" (W4), "KOORA" (W5) and "KUDASAI" (W6) are determined to be connectable, sub-sentence candidates S1, S2 and S4 are generated. Then, if "KOOHI" (W4) is determined to be a possible top word, the start point of the word connectable with the "KOOHI" (W4) is examined and a sub-sentence candidate S3 is generated. Similarly, sub-sentence candidates S5 and S6 are generated.

Thereafter, the end points of the words of the sub-sentence candidates are examined, and sentence candidates are generated. Final candidates can be selected by delivering outputs of the sentence candidate analysis unit 3 to a speech processing apparatus (not shown) and utilizing various data relating to the acoustic features, likelihoods of sentence candidates, and contexts.

According to this process, a speech input having an infinite length is successively subjected to syntactic/semantic analysis, and sentence candidates are extracted. The analyzed sentence candidates are successively output in the lattice form. Thus, an input speech series can be separated in units of a sentence by using grammatical/semantic limitations, without separating the input speech series prior to syntactic/semantic analysis, irrespective of the inherent meaning of the input speech series.

When the infinitely long speech input is successively subjected to syntactic/semantic analysis and sentence candidates are extracted, a problem arises regarding the limit of the memory area for storing the successively output sentence candidates. This problem, however, is solved by setting a boundary line for selecting sentence candidates and forcibly discarding sentence candidates irrelevant to the flow of a current dialogue, e.g. sentence candidates talked ten minutes ago.

Figures 21, 23:
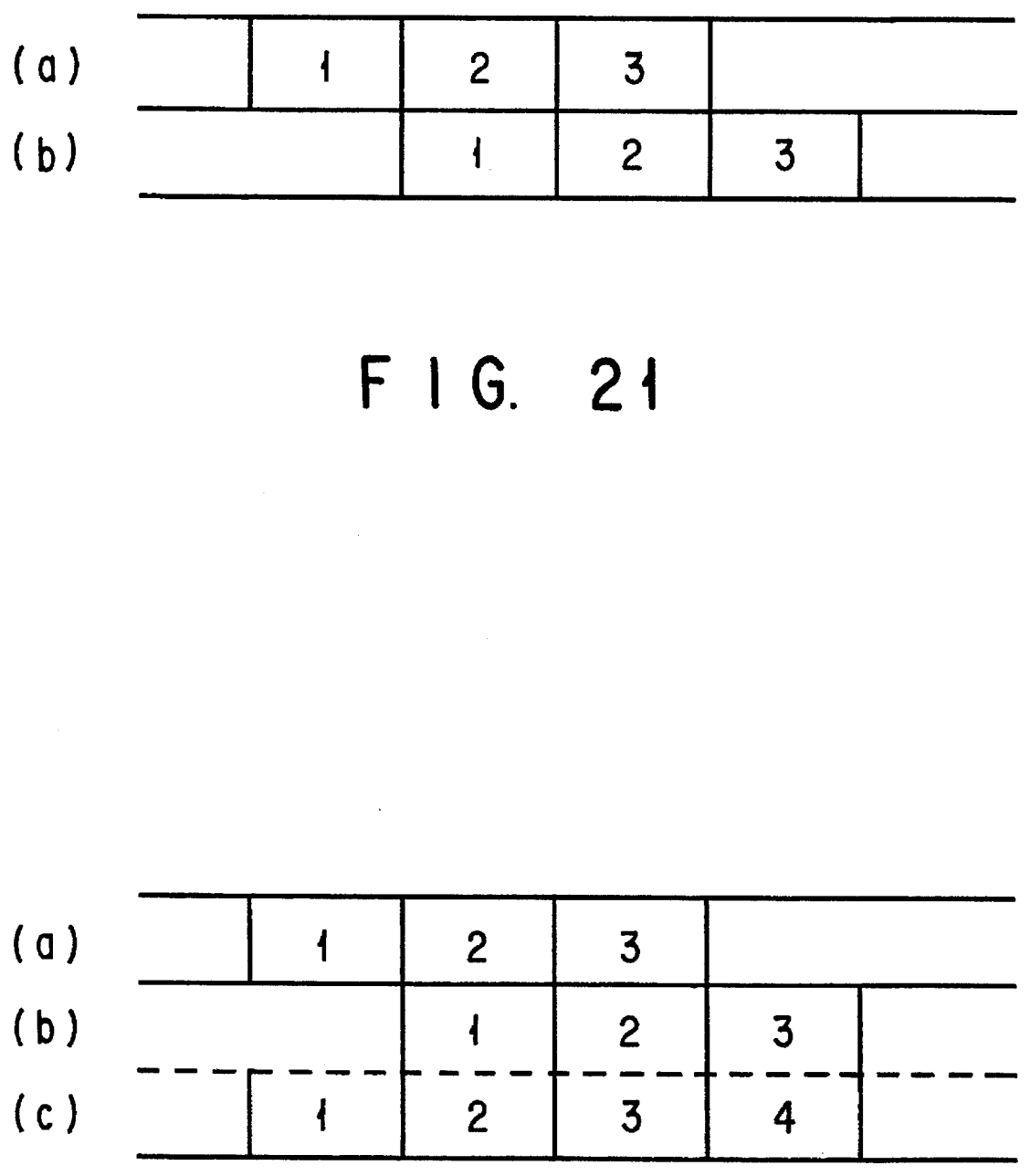

Further, as shown in the timing chart of FIG. 21, the speech input (a) and recognition based on the end point synchronism of words and syntactic/semantic analysis (b) based on input word end point synchronism may be performed on a frame-by-frame basis in a pipeline manner. Thereby, temporal delay from the speech input to the output of analysis result can be reduced to a minimum. The minimum delay is equal to the time of one frame (e.g. 8 msec).

Figure 22:
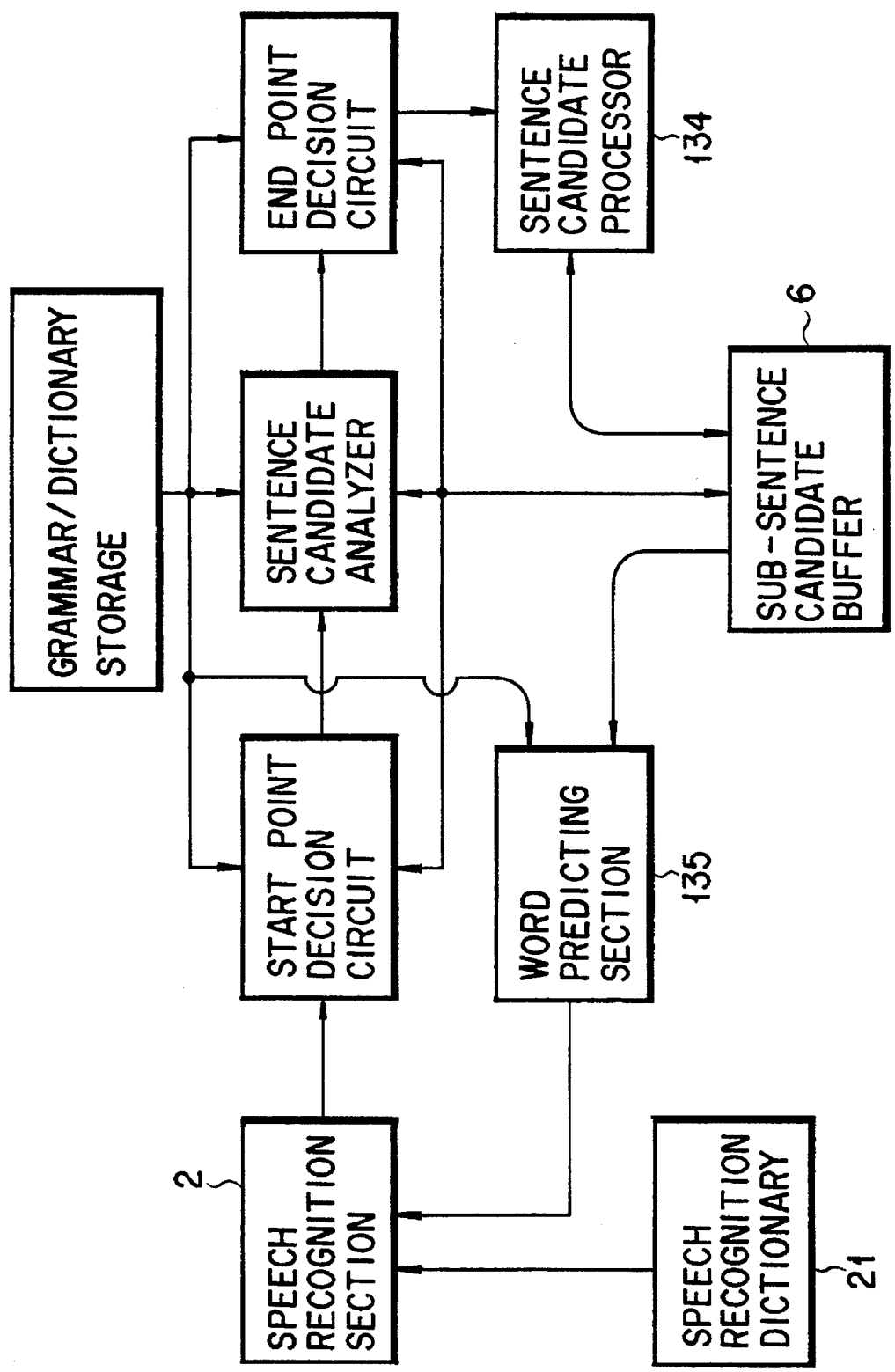
FIG. 22 Shows a schematic structure of a speech recognition apparatus according to another embodiment of the invention.

Another embodiment of the invention will now be described with reference to FIG. 22.

In this embodiment, a word prediction unit 135 is provided in addition to a syntactic/semantic analysis unit 131, a sentence candidate analysis unit 132 and a sentence end point determining unit 133, which are connected to a speech recognition unit 2, and a sentence candidate processing unit 134.

The syntactic/semantic analysis unit 131, sentence candidate analysis unit 132, sentence end point determining unit 133, and a sentence candidate processing unit 134 have the same structures as the corresponding parts of the preceding embodiment. The word prediction unit 135 predicts words connectable to the sub-sentence candidates stored in the sub-sentence candidate buffer 6, and only the predicted words are recognized by the speech recognition unit 2. For example, at the start of processing, only the word situated at the top of a sentence is recognized. In the example of the grammar shown in FIG. 4, "HANBAAGA (hamburger)", "TIIZU BAAGA (cheese burger)", "POTETO (potato)", "KOOHI (coffee)" and "KOORA (cola)" are first words to be recognized. In this case, state number "0" of the LR parse table of FIG. 6 indicates the processing start state, and it is understood, by referring to the LR parse table, that only "HANBAAGA (hamburger)", "TIIZU BAAGA (cheese burger)", "POTETO (potato)", "KOOHI (coffee)" and "KOORA (cola)" are the words to be recognized. Regarding the grammar shown in FIG. 4, when the last word of the sub-sentence candidate is "NUM", the following word is "FOOD", "DRNK", or "VP", and not "NUM". This corresponds to state No. 2 in the LR parse table of FIG. 6. When the last words of sub-sentence candidates are all "NUM", i.e. state No. 2, there is no need to collate six words of "IKKO (ONE)", "NIKO (two)" and "SANKO (three)". Thus, the word prediction unit 135 predicts the subsequent possible words by using the sub-sentence candidates under analysis and the grammar data, and the number of words to be recognized is reduced by controlling the speech recognition unit 2. Thereby, the amount of calculations is reduced.

FIG. 23 is a timing chart of the processing wherein the speech input (a), recognition based on the end point synchronism of words and syntactic/semantic analysis (b) based on input word end point synchronism, and word prediction (c) are performed on a frame-by-frame basis in a pipeline manner. Even if the word prediction function is incorporated, the pipeline processing can be performed and the time needed from the speech input to the output of sentence analysis result can be reduced.

As has been described above, according to the present invention, the contents of necessary data are fully examined to understand an input spontaneous speech and extract a semantic expression, thereby realizing robust and high performance speech recognition of spontaneous speech including, for example, meaningless words such as "ANOO (ur)" and "EETO (er)", silent periods, muttering and ellipsis. Since dialogue between human and machines in real world can be processed, the human-machine interface capacity is remarkably enhanced.

The above embodiments described are designed to process Japanese speech input, nonetheless, the present invention may be applied to a speech recognition apparatus which can process input speech of any other language.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A speech recognition apparatus comprising:

speech analyzing means for receiving an external speech signal, analyzing the speech signal, and generating a speech feature parameter series;

dictionary means being storing a plurality of predetermined words having reference vectors;

speech recognition means including means for converting the speech feature parameter series input from said speech analyzing means into a plurality of speech feature vectors, and means for matching each of the speech feature vectors with the reference vectors of predetermined words in said dictionary means, and outputting a series of a plurality of word candidates used as keywords; and syntactic analysis means for analyzing the series of the word candidates as the keywords according to syntactic limitations, said syntactic analysis means including means for analyzing a temporal connection relationship of temporally discrete keywords and a syntactic connection relationship thereof, and generating a plurality of sentence candidates.

2. The speech recognition apparatus according to claim 1, wherein said speech analyzing means includes converting means for converting the speech signal to a digital signal, processing the digital signal by means of analysis processing including FFT (Fast Fourier Transform), filter analysis, LPC (Linear Predictive Coding) analysis and cepstrum analysis, and generating the speech feature parameter series.

3. The speech recognition apparatus according to claim 1, wherein said speech recognition means is connected to said dictionary means being storing speech feature patterns corresponding to the keywords, and comprises matching means for matching the speech feature patterns of the dictionary means with each of the speech feature vectors.

4. The speech recognition apparatus according to claim 3, wherein said speech recognition means comprises a speech recognition unit which employs a word spotting method in which the speech feature parameter series generated by said speech analyzing means is matched with the speech feature patterns of said dictionary means at every predetermined frame cycle.

5. The speech recognition apparatus according to claim 4, wherein said speech recognition means matches the speech feature parameter series with the speech feature patterns of said dictionary means at every frame cycle of 8 msec.

6. The speech recognition apparatus according to claim 1, wherein said speech recognition means shifts successively an end point of the input speech feature parameter series by a predetermined time, and matches the speech feature vector obtained in each of start point candidate periods determined with respect to each position of the shifted end point, i.e. in each of periods between the shifted end point and different start points with the speech feature patterns of said dictionary means, in order to perform word recognition and generate a plurality of word candidates.

7. The speech recognition apparatus according to claim 1, wherein said syntactic analysis means includes means for receiving the recognition result from said speech recognition means in the form of temporally discrete word series, performing syntactic analysis by using likelihood of each word, and finding likelihood of each of the sentence candidates by means of evaluation function.

8. The speech recognition apparatus according to claim 7, wherein said syntactic analysis means includes means for outputting preferentially one of the sentence candidates which has a highest likelihood.

9. The speech recognition apparatus according to claim 1, wherein said syntactic analysis means includes means for analyzing a temporal connection relationship of temporally discrete keywords and a syntactic and/or semantic connection relationship thereof, and generating a plurality of semantic expressions corresponding to the analyzed series of the keywords.

10. The speech recognition apparatus according to claim 1, wherein said syntactic analysis means includes grammar/dictionary memory means which stores grammar and dictionary data relating to syntactic/semantic data and temporal relationship of an input sentence, and means for performing syntactic and semantic analysis with use of the grammar/dictionary data of said memory means.

11. The speech recognition apparatus according to claim 1, wherein said syntactic analysis means has sub-sentence candidate buffer means for storing a plurality of sub-sentence candidates produced during analysis.

12. The speech recognition apparatus according to claim 11, wherein said syntactic analysis means includes means for outputting one of the sub-sentence candidates as a sentence candidate.

13. The speech recognition apparatus according to claim 11, wherein said syntactic analysis means comprises means for determining whether one of the word candidates received from said speech recognition means is a top word of a sentence, by referring to the syntactic data stored in said grammar/dictionary memory means, means for generating a semantic expression of one of the sub-sentence candidates as a sub-sentence when said one of the word candidates is the top word of the sentence, and sub-sentence candidate buffer means for storing one of the sub-sentence candidates and its semantic expression.

14. The speech recognition apparatus according to claim 11, further comprising means for predicting a possible word candidate on the basis of syntactic limitations and the sub-sentence candidates under analysis, and using the predicted word candidate for the next input speech recognition processing.

15. The speech recognition apparatus according to claim 14, wherein said predicting means includes means for detecting the word candidates which are connectable to each other from the sub-sentence candidate.

16. The speech recognition apparatus according to claim 1, wherein said speech recognition means is connected to said syntactic analysis means and includes means for outputting word candidates in the form of a word lattice and converting the same to temporally discrete keyword lattices.

17. The speech recognition apparatus according to claim 16, wherein said syntactic analysis means includes means for analyzing a temporary connection relationship of the temporal discrete keywords of the keyword lattices and a syntactic connection relationship thereof, to generate a semantic expression of each of the keyword lattices.

18. A speech recognition apparatus comprising:
speech analyzing means for receiving an external speech signal, analyzing the speech signal and generating a speech feature parameter series;

dictionary memory means for storing a plurality of predetermined words;

speech recognition means including means for converting the speech feature parameter series input from said speech analyzing means into a plurality of speech feature vectors, matching each of the speech feature vectors with the reference vectors of predetermined words in said dictionary memory means, and outputting a series of word candidates;

means for detecting whether or not one of the word candidates is a top word of a sentence and the one of the word candidates being the top word and another following thereto are connectable to each other in time and in grammar, and outputting a combination of the connectable word candidates as a sub-sentence candidate; and means for determining whether one of the sub-sentence candidates can be established as a sentence, and generating a sentence candidate.

19. A speech recognition apparatus according to claim 18, wherein said means for determining includes means for establishing a sentence when a word candidate corresponding to an end of the sentence is detected.

20. A speech recognition apparatus comprising: speech recognition means for matching a pattern of an input speech signal with a plurality of prepared dictionary words and outputting a plurality of temporally discrete words as a plurality of keyword candidates; and syntactic and/or semantic analysis means for checking whether or not the keyword candidates are connectable to each other on the basis of a syntactic and/or semantic rule and outputting a combination of connectable keyword candidates as a sentence candidate.

21. A speech recognition apparatus comprising:

speech analyzing means for receiving an external speech signal, analyzing the speech signal, and generating a speech feature parameter series;

dictionary means being storing a plurality of predetermined words;

speech recognition means including means for converting the speech feature parameter series input from said speech analyzing means into a plurality of speech feature vectors, and means for matching each of the speech feature vectors with the reference vectors of predetermined words in said dictionary means, and outputting a series of a plurality of word candidates used as keywords; and syntactic analysis means for analyzing the series of the word candidates as the keywords according to syntactic limitations, and generating a plurality of sentence candidates, and wherein said syntactic analysis means includes grammar/dictionary memory means which stores grammar and dictionary data relating to syntactic/semantic data and temporal relationship of an input sentence, means for determining whether one of the word candidates received from said speech recognition means is a top word of a sentence, by referring to the syntactic data stored in said grammar/dictionary memory means, means for generating a semantic expression of one of the sentence candidates as a sentence when one of the word candidates is the top word of the sentence, and sentence candidate buffer means for storing the sentence and its semantic expression.

22. A speech recognition apparatus comprising:

speech analyzing means for receiving an external speech signal, analyzing the speech signal, and generating a speech feature parameter series;

dictionary means being storing a plurality of predetermined words;

speech recognition means including means for converting the speech feature parameter series input from said speech analyzing means into a plurality of speech feature vectors, and means for matching each of the speech feature vectors with the reference vectors of predetermined words in said dictionary means, and outputting a series of a plurality of word candidates used as keywords;

syntactic analysis means for analyzing the series of the word candidates as the keywords according to syntactic limitations, and generating a sentence candidate, said syntactic analysis means having sub-sentence candidate buffer means for storing a plurality of sub-sentence candidates produced during analysis; and means for predicting a possible word candidate on the basis of syntactic limitations and the sub-sentence candidates under analysis, and using the predicted word candidate for the next input speech recognition processing.

* * * * *